(12) United States Patent
Ishikawa et al.

(10) Patent No.: US 8,718,285 B2
(45) Date of Patent: May 6, 2014

(54) DECODING DEVICE, CODING AND DECODING DEVICE, AND DECODING METHOD

(75) Inventors: Tomokazu Ishikawa, Osaka (JP); Takeshi Norimatsu, Hyogo (JP); Huan Zhou, Singapore (SG); Zhong Hai Shan, Singapore (SG); Kok Seng Chong, Singapore (SG)

(73) Assignee: Panasonic Corporation, Osaka (JP)

( * ) Notice: Subject to any disclaimer, the term of this patent is extended or adjusted under 35 U.S.C. 154(b) by 397 days.

(21) Appl. No.: 12/920,141

(22) PCT Filed: Mar. 26, 2010

(86) PCT No.: PCT/JP2010/002214
§ 371 (c)(1),
(2), (4) Date: Oct. 4, 2010

(87) PCT Pub. No.: WO2010/109918
PCT Pub. Date: Sep. 30, 2010

(65) Prior Publication Data
US 2011/0051940 A1    Mar. 3, 2011

(30) Foreign Application Priority Data
Mar. 26, 2009 (JP) ................. 2009-075722

(51) Int. Cl.
*H04R 5/00* (2006.01)

(52) U.S. Cl.
USPC ............. 381/22; 381/303; 381/307; 381/310; 381/80

(58) Field of Classification Search
USPC ........... 381/1, 2, 6, 10, 14, 15, 16, 17, 18, 19, 381/20, 21, 22, 23, 26, 300, 302, 303, 304, 381/305, 307, 310, 61, 77, 80, 82, 85, 86, 381/332, 91, 92, 119, 122; 379/202.01, 379/399.02; 704/E19.005, E19.008, 704/E19.023, E19.026, E19.027, E19.028, 704/E19.039, E19.04, E19.042, E19.048; 700/94; 370/464, 465, 468, 470, 472
See application file for complete search history.

(56) References Cited

U.S. PATENT DOCUMENTS

| 5,734,724 A | 3/1998 | Kinoshita et al. |
| 2004/0120345 A1* | 6/2004 | Yamaguchi et al. .......... 370/465 |

(Continued)

FOREIGN PATENT DOCUMENTS

| JP | 9-074446 | 3/1997 |
| JP | 2003283672 A * | 10/2003 |

(Continued)

OTHER PUBLICATIONS

B. B. Bauer, "Phasor analysis of some stereophonic phenomena", IRE Transactions on Audio, vol. 10, pp. 18-21, Jan. 1962.

(Continued)

*Primary Examiner* — Leshui Zhang
(74) *Attorney, Agent, or Firm* — Wenderoth, Lind & Ponack, L.L.P.

(57) ABSTRACT

An object decoding unit receives a plurality of pieces of coded acoustic information coded on an object basis and decodes the received coded acoustic information on an object basis to generate object signals. A rendering unit positions, for each acoustic signal resulting from synthesizing the object signals, a virtual sound source of each of the object signals resulting from the object-based decoding, in a listening space, and priority information indicating a priority of the acoustic signal is multiplexed with the coded acoustic information. The rendering unit determines, with reference to the priority indicated in the priority information or the number of object signals included in the acoustic signal, a size of an area of the listening space which is allocated to the acoustic signal, and positions, within the area, the virtual sound source of each of the object signals included in the acoustic signal.

13 Claims, 12 Drawing Sheets

(56) References Cited

U.S. PATENT DOCUMENTS

| | | | |
|---|---|---|---|
| 2006/0008117 A1 | 1/2006 | Kanada | |
| 2006/0045275 A1 | 3/2006 | Daniel | |
| 2008/0008323 A1* | 1/2008 | Hilpert et al. | 381/1 |
| 2008/0285771 A1* | 11/2008 | Tanaka et al. | 381/92 |
| 2009/0129576 A1 | 5/2009 | Yamanashi et al. | |
| 2010/0198990 A1 | 8/2010 | Shimada et al. | |

FOREIGN PATENT DOCUMENTS

| | | | |
|---|---|---|---|
| JP | 2006-025281 | | 1/2006 |
| JP | 2006-506918 | | 2/2006 |
| JP | 2006-115364 | | 4/2006 |
| JP | 2008-294619 | | 12/2008 |
| JP | 2008294619 A | * | 12/2008 |
| WO | 2007/010844 | | 1/2007 |
| WO | 2009/001887 | | 12/2008 |

OTHER PUBLICATIONS

Chinese Search Report issued Dec. 9, 2013 in corresponding Chinese Application No. 201080001174.

* cited by examiner

DECODING DEVICE, CODING AND DECODING DEVICE, AND DECODING METHOD

BACKGROUND OF INVENTION

1. Technical Field

The present invention relates to object coding and object decoding devices for coding and decoding acoustic signals in a conference system in which a large number of sites and speakers participate.

2. Background Art

Along with the recent development of broadband communication technologies, the IP communication technology has become so common that even for conferences in the general business scene and communication scenes between standard homes, there emerged a telephone conference system based on the IP communication technology and a communication system with a sense of presence in which not only audio signals but also video images are presented at the same time. In addition, the improvement in speed and stability of the IP communications has contributed to devising a conference system with a sense of presence in which a large number of sites and people can participate. As the enhanced convenience increases the use of the conference/communication system with a large number of people and sites, it becomes important to provide a system in which people can participate more easily.

In a conventional video conference system, for a large number of people and sites to participate, a display screen is evenly divided for the number of people or sites. Accordingly, in the case where an extremely large number of people or sites participate, the display screen looks very confusing. Moreover, the participation of a large number of people or sites crosses lines for audio signals of conversations and thereby makes it difficult to identify which person in which site is speaking. In order to solve this problem, it is necessary to start speech by explicitly saying who is going to speak now or to provide an auxiliary tool to display an image which shows who is speaking, thus raising the need for very cumbersome processing.

In addition, an increase in the number of participants in each of sites participating in a conference increases the number of audio/video signals to be coded and decoded in a transmitting unit and a receiving unit in each of the sites, thus leading to an increase in load on the transmitting unit and receiving unit.

In order to solve these problems, it is necessary to use a method in which multiple signals can be coded at the same time and at a low bitrate. Furthermore, a technology for enabling a flexible control on multiple audio signals is also necessary. In this regard, an audio object coding technique (hereinafter referred to as object coding technique) has been proposed and an device has been proposed which has a feature of separately transmitting and receiving at a low bitrate the multiple object signals coded using the above technique (for example, referred to Patent Literature 1). When the coding using the object coding technique is used, down-mixing information of coded M acoustic signals resulting from down-mixing of multiple object signals is transmitted with a small amount of control information and on a receiving side, the information can be reconstructed as N audio object signals (M is smaller than N).

CITATION LIST

Patent Literature

[PTL 1]
United States Patent Application Publication NO. 2008/0008323

Non Patent Literature

[NPL 1]
B. B. Bauer, "Phasor analysis of some stereophonic phenomena", IRE TRANSACTIONS ON AUDIO, Vol 10, pp 18-21, January 1962.

SUMMARY OF INVENTION

As described above, when the object coding technique is applied to a conference system so that each speaker (sound source) is treated as an audio object, the object coding technique enables high efficiency coding. However, only the application of the object coding technique does not solve the problem of crossed lines for conversation voice in a conference system adapted for a large number of sites and people, and difficulty in hearing the conversations remains.

In view of the above problems, an object of the present invention is to provide a coding device, a decoding device, a conference system, a coding method, and a decoding method, which provide highly audible conversation voice in each site in a conference system using the object coding technique.

In order to solve the above problems, the decoding device according to an aspect of the present invention includes: an object decoding unit configured to receive a plurality of pieces of coded acoustic information coded on an object basis and decode the received coded acoustic information on an object basis to generate one acoustic signal from one piece of the coded acoustic information, the one acoustic signal resulting from synthesizing one or more object signals; and a rendering unit configured to position, for each of the acoustic signals, a virtual sound source in a predetermined listening space, the virtual sound source being associated with one of the object signals included in the generated acoustic signal, wherein priority information indicating a priority of the acoustic signal is multiplexed with the coded acoustic information, and the rendering unit is configured to determine, with reference to the priority indicated in the priority information, a size of an area of the listening space which is allocated to the acoustic signal, and to position, within the area allocated to the acoustic signal, the virtual sound source of each of the object signals included in the acoustic signal.

With this structure, the virtual sound source of object signals for each acoustic space (site) corresponding to certain coded acoustic information is positioned in a receiving space according to its importance or the number of object signals, with the result that even when the number of object signals included in the acoustic space (site) is large, the virtual sound source can be positioned in the receiving space so that the object signals can be easily distinguished from each other. Furthermore, the virtual sound source can be positioned in the receiving space according to the priority of the acoustic signal, that is, so that an object signal included in the acoustic signal with a higher priority is more audible. Accordingly, an important site or an active site with a large number of sound sources such as speakers is positioned so as to have a large space so that the sound from the site can be made more audible.

Furthermore, each of the object signals may be associated with one sound source in an acoustic space in which the coded acoustic information is coded on an object basis, and the acoustic signal may be a signal resulting from synthesizing the one or more object signals generated in the acoustic space. This allows one or more object signals in an acoustic space to be virtually positioned in a receiving space on the receiving side with an appropriate distance from each other, with the result that mixing up of the object signals on the receiving side can be reduced, thus producing an effect of improving audibility of separate sound.

The rendering unit may be configured to determine the size of the area so that a larger area is allocated to the acoustic signal with a higher priority. With this, the rendering unit is capable of positioning a virtual source of an object signal included in important acoustic signals with a high priority, in a larger area of the acoustic space on the receiving side. The object signal included in the important acoustic signals with a high priority can therefore be made more audible.

Furthermore, the priority information is global gain information indicating a gain of down-mixing information in the object-based coding, and the priority is proportional to the gain. With this, even when no priority information has been multiplexed with the coded acoustic information, the decoding device is capable of calculating priority information by comparing pieces of global gain information included in coded acoustic information, each of which piece corresponds to an acoustic signal.

Moreover, the coded acoustic information may include gain ratio information indicating a gain ratio of each of the object signals to the down-mixing information, and the object decoding unit may be configured to calculate, for each of the object signals, a product of a value of the global gain information and a value of the gain ratio information, and to provide the calculated value as second priority information for each of the object signals. With this, even when the second priority information corresponding to each of the object signals has not been multiplexed with the coded acoustic information, the decoding device according to an aspect of the present invention detects the sound volume of each object signal as the second priority information, thereby being capable of positioning the object signals so that the object signal with a higher value of the detected second priority, that is, the object signal having a higher sound volume, is placed at a more audible position.

Furthermore, the object decoding unit may be configured to decode only the object signal with the priority equal to or higher than a predetermined rank, and not to decode the object signal with the priority lower than the predetermined rank, the object signal being included in the acoustic signal, and the priority being indicated in the second priority information. By so doing, the removal of not so important object signals allows a reduction in the decoding processing load in the decoding device.

The object decoding unit may be configured to assign a rank of the priority only to the object signal with the priority equal to or higher than a predetermined rank, and to assign a uniform rank of the priority that is lower than the predetermined rank to the object signal with the priority lower than the predetermined rank, the object signal being included in the acoustic signal. This makes it possible to reduce the processing load for positioning, in priority order, the virtual sound source of the object signals which are less important than a certain level, in the listening space.

Furthermore, each piece of the coded acoustic information may include identification information for specifying the acoustic space, the object decoding unit may be configured to (I) measure, for each piece of the identification information, a code length of the coded acoustic information received per unit time, (ii) set the code length of the coded acoustic information measured per unit time, as an activity level of the acoustic space specified using the identification information, and (iii) determine, for each of the acoustic spaces, the priority of the acoustic signal based on the priority information and the activity level, and the rendering unit may be configured to determine the size of the area which is included in the acoustic space specified using the identification information and allocated to the acoustic signal so that the area becomes larger as the priority determined for each piece of the identification information increases. With this, even when no priority information has been multiplexed with the coded acoustic information, the decoding device assumes, as important acoustic space, the acoustic space that transmits coded acoustic information having a long code length per unit time for each identification information by which the acoustic space is specified, and is thereby capable of allocating a larger area of the listening space to the acoustic space on the transmitting side. The object signals of speech from a transmitting site which provides speech in a conference more frequently can therefore be more auditorily easily caught, for example.

Furthermore, the object decoding unit may be configured to determine the priority of the acoustic signal for each of the acoustic spaces so that the priority is proportional to the number of the object signals included in the acoustic signal. This makes it possible to position object signals more dispersively so that as the number of object signals included in the acoustic signals, for example, the number of speakers who speak at the same time in a conference room for television conference, becomes larger, the object signal included in the acoustic signals that represents speech of each speaker becomes more audible.

The rendering unit may be configured to position the area allocated to each of the acoustic signals so that the area becomes closer to a predetermined front direction of a listening position as the priority indicated in the priority information for the acoustic signal increases. With this, a more important acoustic signal with a higher priority is positioned closer to the front of the listening position, allowing speech from a more important site to be more audible.

Moreover, information indicating a relative positional relationship between the acoustic spaces is multiplexed with each piece of the coded acoustic information, and the rendering unit is configured to position the acoustic signal around a predetermined listening position according to the information indicating the positional relationship. This allows a spatial layout in which the relationship of sites corresponding to respective acoustic signals, the conditions of the sites, etc. are auditorily easily comprehensible, thus producing an effect that at the listening position, it is possible to easily recognize the positional relationship of the sites to which the respective speakers belong and thereby possible to intuitively grasp which site the speaker's speech is being made in.

Furthermore, the rendering unit may be configured to determine a position of the virtual source corresponding to each of the object signals so that the virtual source corresponding to the object signal becomes closer to a listening position as the priority of the object signal indicated in the second priority information increases. With this, the object signal with a high priority, for example, voice of an important person, is positioned close to the listening position, with the result that more important person's speech can be made more audible.

Moreover, each piece of the coded acoustic information may include relative positional information indicating a relative position of a sound source of each of the object signals to a predetermined reference position in an acoustic space, and the rendering unit may be configured to calculate a position, in the listening space, of the virtual sound source of each of the object signals, from the relative position indicated in sound environment information, using, as the reference position, a predetermined position in the area allocated to each of the acoustic signals, and to place the virtual sound source of the object signal in the calculated position. This allows each site to transmit the position of a speaker in each site to the receiving side and then allows the receiving side to position the virtual sound source of the speaker's voice at an equivalent position of the speaker in each site.

In order to solve the above problems, the coding and decoding device according to an aspect of the present invention includes: a sound pickup unit configured to pick up an acoustic signal formed of one or more object signals; a separation unit configured to separate the picked-up acoustic signal into the object signals; an object coding unit configured to generate coded acoustic information by coding, on an object basis, the object signals obtained by the separation, and to multiplex, with the generated coded acoustic information, priority information indicating a priority of each of the acoustic signals and the number of the object signals included in the acoustic signal; an object decoding unit configured to receive the coded acoustic information from other units and decode each piece of the received coded acoustic information on an object basis to generate one acoustic signal from one piece of the coded acoustic information, the one acoustic signal resulting from synthesizing the one or more object signals; and a rendering unit configured to position, for each of the acoustic signals, a virtual sound source in a predetermined listening space, the virtual sound source being associated with one of the object signals generated by the object decoding unit, wherein the rendering unit is configured to refer to determine, with reference to the priority indicated in the priority information, a size of an area of the listening space which is allocated to the acoustic signal, and to position, within the area allocated to the acoustic signal, the virtual sound source of each of the object signals included in the acoustic signal. This makes it possible to generate the coded acoustic information including a priority of an acoustic signal of each site, which becomes useful in rendering for making speakers' voices in a conference more audible, and also possible to decode, on an object basis, the coded acoustic information received from another unit, and then position, in the listening space, the virtual sound source of the object signal resulting from the decoding so that the sound can be easier for the listener to listen to.

In a conference system in which a large number of sites and speakers participate through IP communication network, the use of object coding technique enables a free control on a spatial layout of acoustic signals on a receiving site side. Furthermore, according to the claimed invention, a voice of an important speaker or a sound from an important site can be virtually positioned in a large area of an acoustic space on a receiving side so that the virtual sound source of voice of the important speaker in the important site can be positioned in a highly audible virtual space. Besides, the layout can be set to suit the convenience of the transmitting side and the receiving side, which leads to an excellent effect of drastically improving a sense of presence in a conference. It is also possible to provide a virtual conference system capable of controlling audio signals of individual speakers independently and flexibly. Along with the control on the audio signal for each object (speaker), providing the virtual conference system produces an effect of further improving a sense of presence in a conference.

DETAILED DESCRIPTION OF INVENTION

Embodiments of the present invention are described below with reference to the drawings.

First Embodiment

Figure 1:
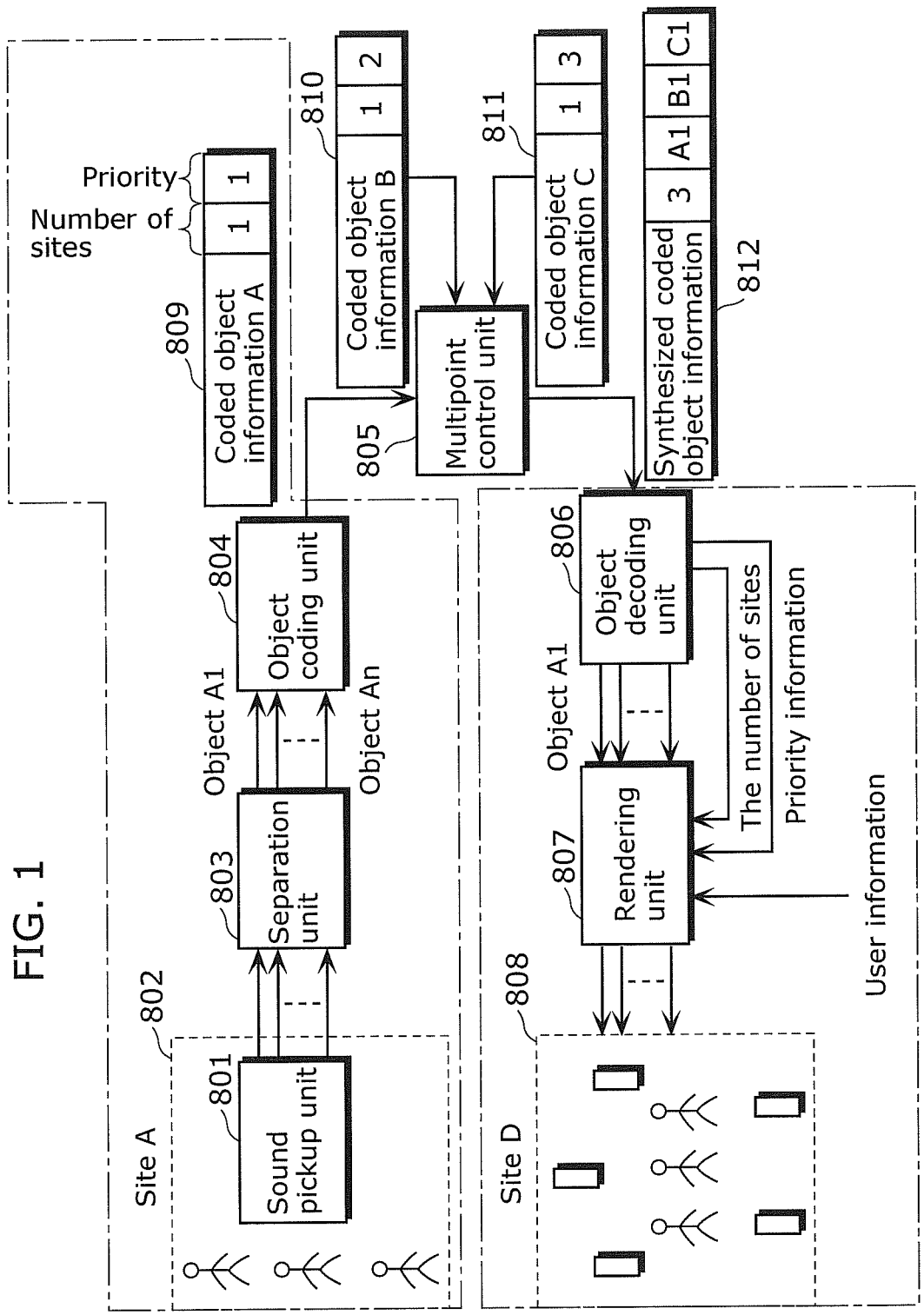
FIG. 1 is a configuration diagram of a virtual conference system applying object coding and including a rendering unit.

With reference to FIG. 1, the following describes an object coding and object decoding device in a conference system with a sense of presence, in which a large number of sites and people participate. Other than a site A and a site D shown in FIG. 1, assume that a site B and a site C participate in this conference system although they are not shown. In the following, only the process in the site A is described as a representative example on a transmitter side (coding device side), and processes in the other sites B and C are not described because they are alike. As to the site D, only the process of reproducing acoustic signals after receipt of coded object information is described as a representative example on a receiver side (decoding device side), and also in the site D, a transmitter-side configuration may be provided as in the case of the sites A to C. In such a conference system, a site in which only a receiver-side configuration is provided without transmitter-side configurations is in a status of an observer, who does not speak in the conference. Although the sites A to C are described as examples of the transmitter side, assume that the receiver-side configurations are also provided in these sites. In a site on the receiver side, for example, in the site D, an object decoding unit 806 and a rendering unit 807 are provided. In the site on the receiver side, a multipoint control unit 805 may be provided in an earlier stage, for example. In addition, in a site on the transmitter side, for example, in the site A, a sound pickup unit 801, a separation unit 803, and an object coding unit 804 are provided.

In a conference room 802 in the site A, acoustic signals are picked up by the sound pickup unit 801 which is implemented with a microphone array including multiple microphones.

The separation unit 803 removes noise components from the acoustic signals obtained from the sound pickup unit 801 and then separates the noise-removed acoustic signals into multiple acoustic signals which are acoustically independent of each other with no spatial relevancy. Furthermore, the separation unit 803 inputs the separated acoustic signals (hereinafter referred to as "audio object signal" or simply "object signal") to the object coding unit 804. The acoustically independent object signal herein indicates, for example, voice of each speaker joining a conversation, background music in a conversation, or a phone ring, and the acoustic signal herein indicates a signal of synthesized voice of speakers speaking at the same time. The object signal is therefore not necessarily formed of human voice, but even when each of the object signals is regarded as voice of each speaker, it causes no problem because a room with little noise is usually chosen for a television conference.

The separated audio object signals are coded on an object basis by the object coding unit 804. This object coding is performed as explained in the section of background art. The object coding unit 804 generates some pieces of control information as object separation signals and multiplexes the control information with a bitstream. This control information is, for example, an object level difference (OLD) indicating a difference in acoustic level between objects, a normalized related gain (NRG) indicating normalized energy between objects, or an inter object coherence (IOC) indicating correlation/coherence between objects. The control information is not limited to the above examples and may be other information related to acoustic signals for each object or across objects. It is however preferable that at least one of OLD, NRG, and IOC be included in the control information.

In addition to the coded data resulting from coding of the acoustic signals from a corresponding site and the control information, two pieces of information are further transmitted from the object coding unit 804. These two pieces of information are information indicating the number of participating sites (num Site) and priority information ($Priority_i$) on participating sites or on objects. In the case where $Priority_i$ indicates priority information on participating sites, "$i$" is, for example, a serial number or ID for each site, with which each site can be uniquely specified, and thereby represents which site, and in the case where $Priority_i$ indicates priority of objects, "$i$" is, for example, a serial number or ID for each object, with which each object can be uniquely specified, and thereby represents which object. Although FIG. 1 shows an example in which the priority information is added to the tail end of the coded object information, the present invention is not limited to this shown example, and the priority information may therefore be added to an earlier part, for example, a header part or a part where a parameter is written, of the coded object information and may thus be transmitted. With the priority information thus added to the earlier part of the coded object information, the priority of the corresponding site can be known by extracting, in the object decoding unit, only the priority information from the coded object information before starting to decode the coded object information. As a result, on the object decoding unit side, it is possible to decode only minimum necessary object signals when there are a large number of objects and object signals with lower priorities should not to be reproduced, for example. This enables a reduced processing load in decoding in the object decoding unit according to the present embodiment. Moreover, this makes it possible to, for each of object signals, execute processing of determining a rendering angle for positioning a virtual sound source of each of the object signals in a listening space, in parallel with the decoding process of the object signals, thus enabling a reduced amount of process delay in the decoding. The object coding unit 804 for each site sets a value of num Site to a default, i.e., 1, and transmits to the multipoint control unit (MCU) 805 the coded object information including the coded data resulting from coding of acoustic signals and control information with the multiplexed num Site and $Priority_i$. The coded object information transmitted to the multipoint control unit 805 is then sent to another site via the multipoint control unit 805. Alternatively, it may also be possible to exchange the coded object information between the sites without involving the multipoint control unit 805. In this case, the object coding unit 804 transmits the coded object information to the object decoding unit 806 in another site.

Next, the multipoint control unit 805 is described. The multipoint control unit 805 basically receives information from different sites: in this example, receives coded object information A809 transmitted from the site A, coded object information B810 sent from the site B, and coded object information C811 sent from the site C, and synthesizes these pieces of information into one piece of coded object information and then sends the synthesized coded object information to another site. Synthesized coded object information 812 resulting from the above synthesis includes the pieces of information which the multipoint control unit 805 received from all the sites and separation information which is used to separate these pieces of information. In this manner, to each of the sites, a bitstream is sent which includes the pieces of information of all the sites and the separation information with which the pieces of information of the sites other than the site itself that receives the bitsream is separated.

Operation of the multipoint control unit 805 is described in detail. First, at the start of a conference, information for resetting the coding device and the decoding device is exchanged between each of the sites and the multipoint control unit 805. The information for resetting includes the number of sites, a type of the coding method, the number of reproduction channels, the number of microphones, a screen resolution, and a frame rate. When the multipoint control unit 805 determines that the information can be exchanged properly between the sites, then the conference can start. A failure in proper exchange includes the case where a decoder in a site has no unit of decoding coded object information and is therefore unable to deal with coding objects, or the case where available reproduction channels in a so player are fewer than transmission channels.

Figure 2:
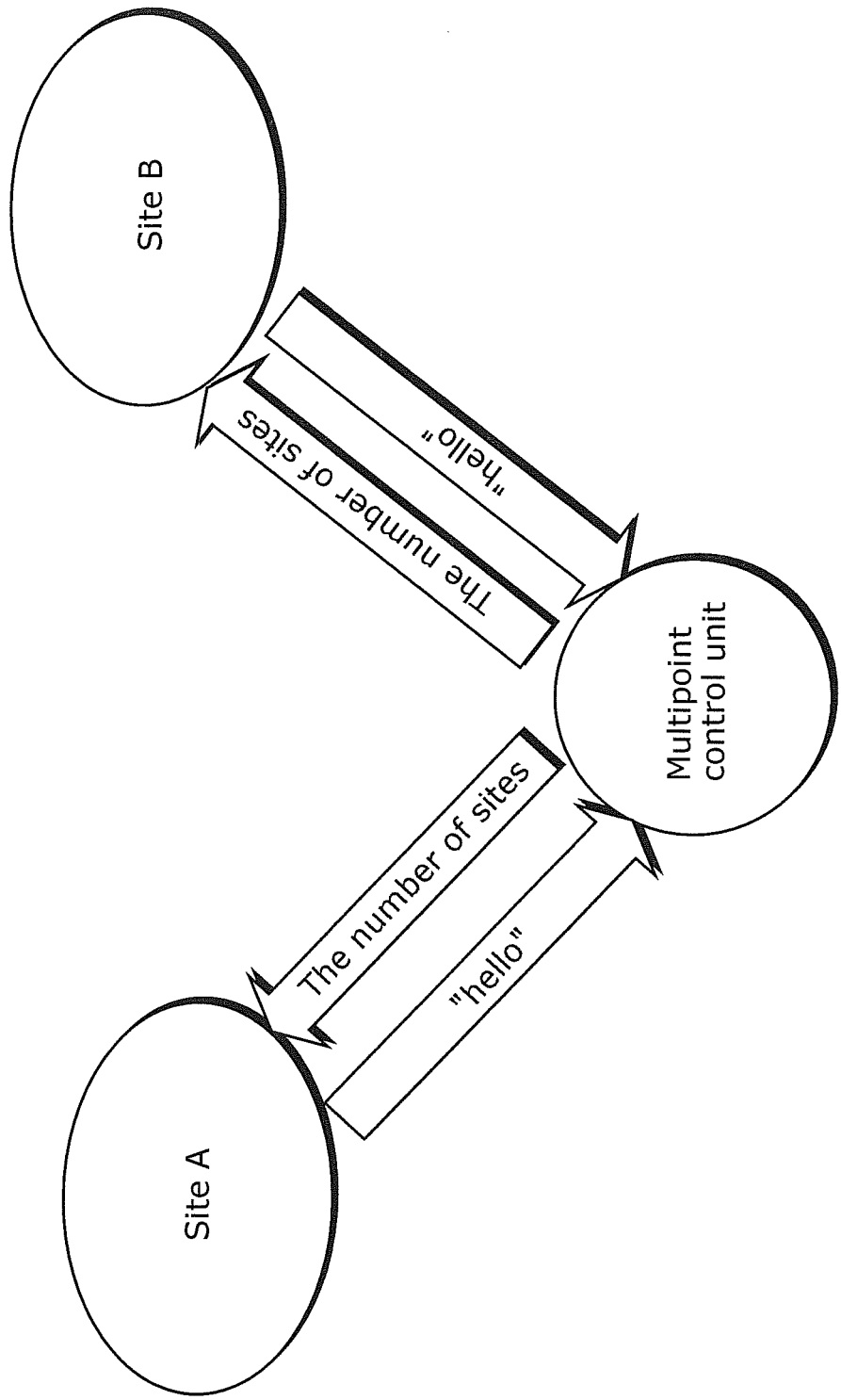
FIG. 2 shows a method of exchanging reset information between a multipoint control unit MCU and a site.

After completing collection, from all the sites, of the information on each site included in the reset information as described above, the multipoint control unit 805 adds up num Site transmitted from the sites. An actual value of num Site can be thus calculated. This can also be calculated in the method shown in FIG. 2. FIG. 2 exemplifies the exchange between each of the sites and the multipoint control unit 805 at the time of reset. The site A transmits to the multipoint control unit 805 the information (for example, a character string "hello") indicating that a predetermined reset is to be asserted, and the site B also transmits it likewise. Even when counting transmitted "hello", the multipoint control unit 805 is still capable of calculating the actual num Site. When the participating sites increase or decrease during the conference in the case where the multipoint control unit 805 always receives num Site of 1 from each of the sites, it is difficult to recognize which site dropped out or which site newly joined. However, when it is determined that a site participating in the conference for the first time sends the information indicating that a reset is to be asserted, it produces an effect of making it easier to recognize the newly joined site.

Next, the multipoint control unit 805 transmits the synthesized coded object information 812 to each of the sites. This synthesized coded object information 812 is obtained by generating synthesized information by synthesizing the coded data of all the participating sites which data includes acoustic signals and control information of each of the participating sites, and then multiplexing the actual num Site and the reset information of the sites other than a receiving site, with the coded information resulting from coding of the generated synthesized information and the separation information for separating the coded data of the sites other than the receiving site from the above synthesized information. By transmission of this synthesized coded object information 812, the information related to each participating site is fed back to the coding/decoding device in each of the sites.

Furthermore, when necessary, the multipoint control unit 805 adjusts the values of Priority; multiplexed with the coded object information which is transmitted from multiple sites. This adjustment is performed such as to multiplex with the coded information the priority information in which that among all the received $Priority_i$, the predetermined number of top $Priority_i$ counted from the highest priority is set as new priority and the remaining $Priority_i$ lower than the top $Priority_i$ is all set at the same value. For example, top five $Priority_i$ is given a value of its rank, and the other $Priority_i$ at the sixth and lower ranks is all given the same value of the sixth rank. This allows a reduction in troublesome processing in the decoding device, by transmission of only the $Priority_i$ of important sites and objects without ranking a too large number of $Priority_i$. Moreover, in this adjustment, setting of the Priority may be changed for each site or for each object, according to information indicating the number of participants in the site, relationship of participants, a voice power level, and voice duration. For example, when $Priority_i$ related to the object signal in the site A has the same value as $Priority_i$ related to the object signal in the site B, an adjustment is made so as to set the $Priority_i$ with higher voice power at a higher value. Alternatively, the set priorities may be ignored, and new priorities may be set based on the order of voice power levels of object signals. That is, the priority information may be set so that an object signal with higher voice power has a higher priority than an object signal with lower voice power. Still alternatively, a site including a larger number of object signals with higher voice power may be set to have the priority information with a higher priority than the other sites. It is to be noted that the information indicating the relationship of participants is, for example, information indicating that a site has no speakers but only audiences participating in the conference or information indicating that a site has a VIP in the participants. Thus, the priority is set for each site or for each object and multiplexed with the coded object information when transmitted to a receiving site. By adjusting $Priority_i$ as above when necessary, it is possible to execute appropriate processing in the receiving site according to the priority.

The object decoding unit 806 decodes, on an object basis, the synthesized coded object information 812 for each site, received from the multipoint control unit 805, and then separates the object signals of the sites. At the same time, the object decoding unit 806 separates the control information, the total number of sites (num Site), and the priority information (Priority). In the case where the coded object information is exchanged between the sites without involving the multipoint control unit 805, the object decoding unit 806 receives the coded object information from the object coding unit 804 in a site other than receiving side site. Also in this case, the object decoding is performed and the object signals of the sites and the other control information or the like are separated as in the above case. The object decoding unit 806 then refers to the separated information to calculate the actual total number of sites and when necessary, changes the setting of the above Priority in the like manner to that performed in the multipoint control unit 805.

Figure 3:
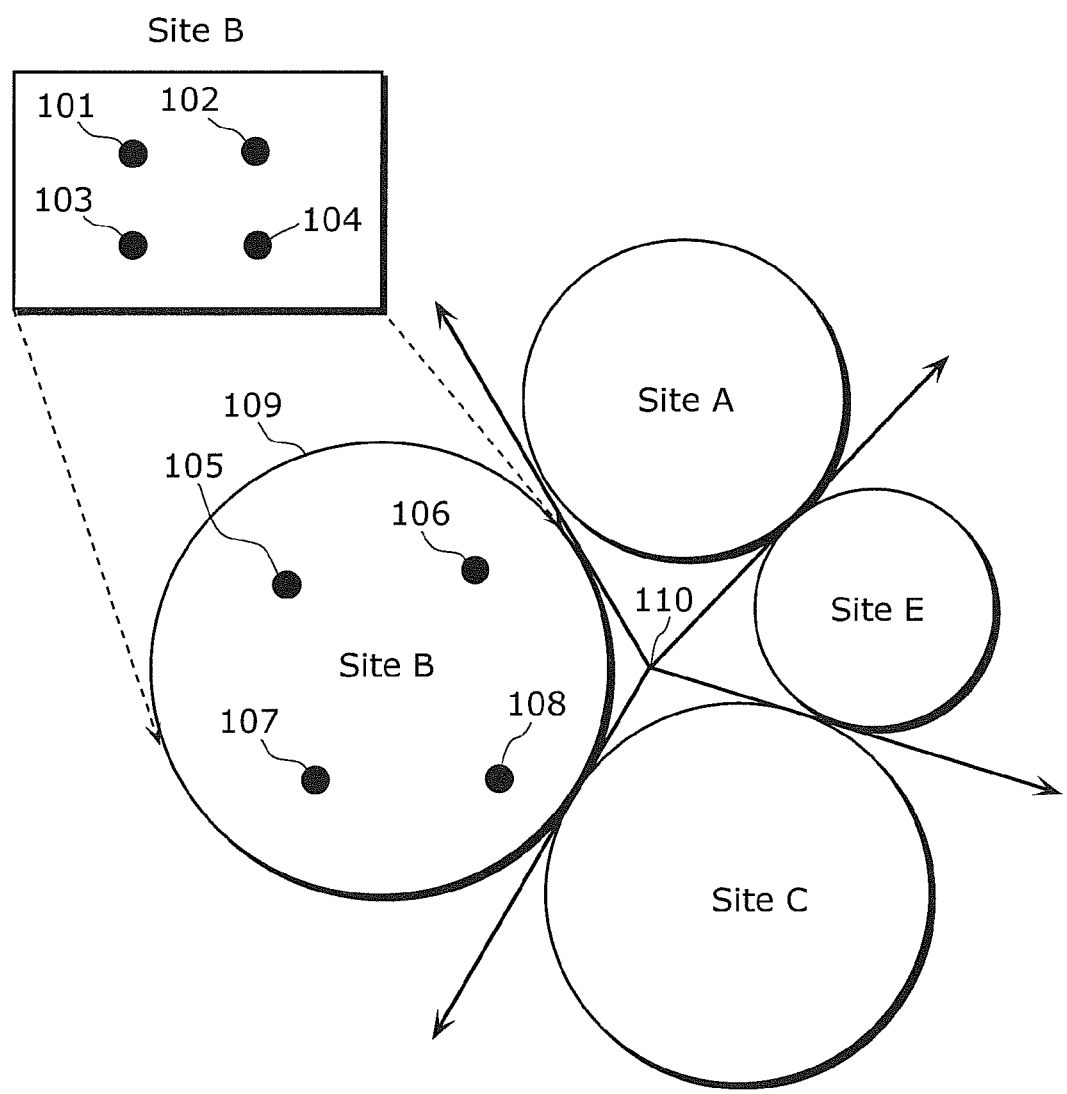
FIG. 3 is a site layout of virtual spaces in a receiving site.

Next, the automatic rendering unit 807 is described. Before rending the object signals of the sites, the rendering unit 807 first determines a virtual layout, in the receiving site (the site D in FIG. 1), of the object signals of the sites other than the receiving site. FIG. 3 schematically shows a method of spatially positioning the object signals in a conference room 808 of the site D. A listening position 110 in FIG. 3 is the center of participants in the site D, the center of the conference room 808 of the site D, the participant him or herself, or a particular participant him or herself who is targeted among participants, and indicates one point at which sound reproduced by a speaker is audible in the site D. In FIG. 3, the rectangle indicates the site B, and 101, 102, 103, and 104 indicate the object signals generated in the site B. The rendering unit 807 virtually groups the object signals according to the site from which the object signals have been transmitted, as shown in the circles in FIG. 3, and acoustically positions the grouped object signals so that the object signals of different sites are sectioned off. For example, when the number of sites participating in the conference is five: the sites A to E as shown in FIG. 3, in the receiving site D, the information of the four sites other than the receiving site D itself is separated from the received information, and the object signals grouped for each site are positioned around the listening position 110. Such grouping makes it easier to know what acoustic sound is transmitted from which site.

Figure 4:
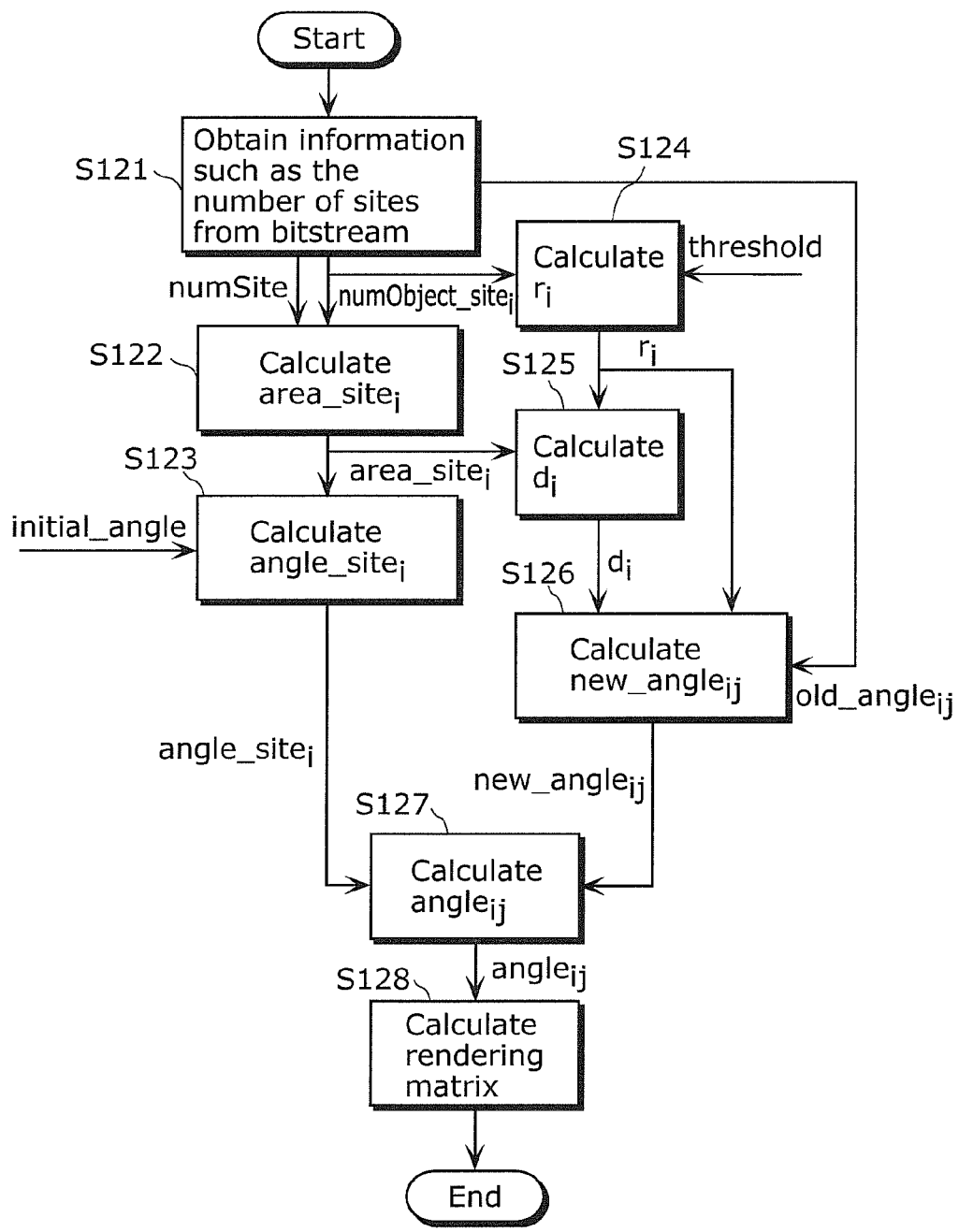
FIG. 4 is a flowchart of automatic rendering process.

The following describes a method of positioning the object signals grouped for each site, with reference to FIG. 4. This layout is determined according to $Priority_i$ of each transmitting site and the number of object signals $numObject\_site_i$ of each site. First, information such as the number of sites included in a received bitstream is obtained (Step S121), and according to $numObject\_site_i$, the rendering angle for each site around the listening position 110 is calculated (Step S122). The rendering angle for a site indicates an angle formed by arrows passing through the listening position 110 as shown in FIG. 3, which angle includes all the object signals grouped for each site and is sectioned so as not to include the object signals of different sites. The rendering angle for each site is determined by Expression 1 using $numObject\_site_i$ included in the coded object information.

[Math. 1]

$$\text{area\_site}_i = \frac{2\pi}{\sum_{j=1}^{numSite} numObject\_site_j} \times numObject\_site_i \quad (\text{Ex. 1})$$

That is, the circumference $2\pi$ around the listening position 110 is divided by the total number of object signals which are to be rendered, and the resultant is multiplied by the number of object signals for each site. The rendering angle $\text{area\_site}_i$ for each site is thus obtained. In this manner, the spatial extent for the acoustic signals for each site changes according to the number of objects in each site. For a site which includes a large number of object signals, a wide acoustic space is virtually allocated, while for a site which includes a small number of object signals, a narrow acoustic space is virtually allocated so that the object signals can be prevented from being positioned too densely or close to each other. Moreover, it becomes easier to auditorily perceive a difference in the number of objects between the sites. Thus, with the rendering unit 807 according to the present embodiment, the sound sources such as speakers from the sites are automatically auditorily separated in the receiving site D, with the result that the voice of each speaker can be more audible, and to a listener at the listening position, the voice sounds as if the speaker in a different site is present around the listener, leading to an improvement in the sense of presence in the conference. While the rendering angle of a virtual spatial region for each site is determined according to the number of object signals included in the site in this example, the present invention is not limited to this example and the rendering angle may be determined according to the priority of each site. For example, the rendering angle for each site can be determined according to the priority of the site by assigning priority of the i-th site (Priority$_i$) to numObject_site$_i$ in the above expression 1.

Figure 5:
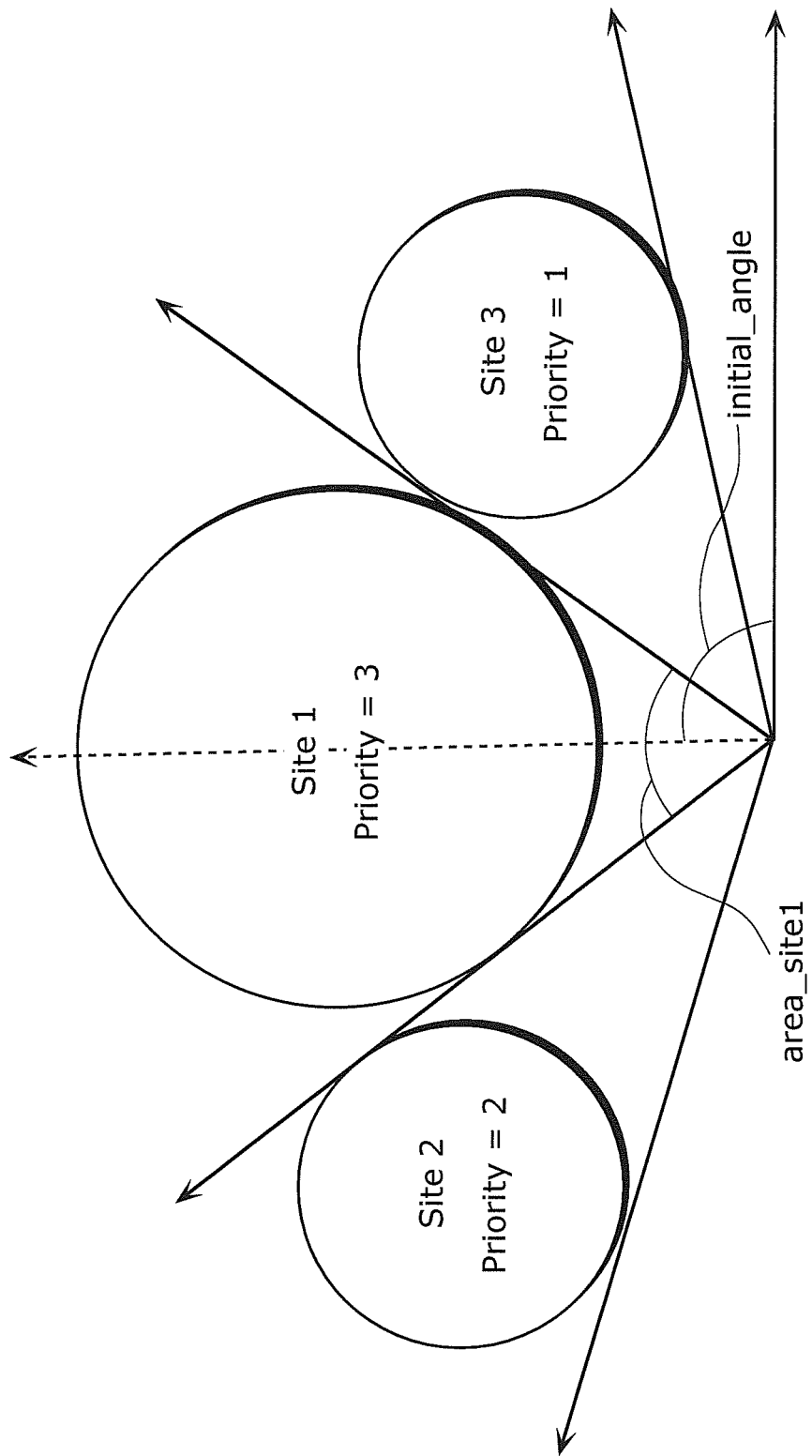
FIG. 5 is a layout for setting virtual spaces based on priorities of the sites in a receiving site.

Next, a position of the rendering angle for each site determined above (hereinafter referred to as a rendering position of a site) is determined around the listening position 110 (Step S123). When Priority$_i$ indicating a priority of each site is set, the rendering position of a site is determined based on Priority$_1$. For example, in the case where the listening position 110 indicates a listener's location, the rendering position of the site with the highest priority is set in front of the listening position 110 as shown in FIG. 5 because, by the nature of human ears, the sound coming from ahead is more audible than the sound coming from behind. Subsequently, in descending order of priority, the rendering positions of the other sites are set at less audible positions. When multiple sites have the same priority, the rendering angle for the site with the highest priority is placed at a highly audible position (initial_angle) and the rendering angles for the other sites may be simply positioned counterclockwise using Expressions 2 and 3. In the case where Priority$_i$ represents the priority of each object signal, the site including the object signal with the highest priority or the site including the largest number of object signals with high priorities may be placed at a highly audible position. By thus determining the rendering positions of the sites based on the priority information, it is possible to make acoustic sound with a higher priority more audible.

[Math. 2]

$$\text{angle\_site}_i = \text{angle\_site}_{i-1} + \text{area\_site}_{i-1}, (2 \leq i \leq \text{numSite}) \quad \text{(Ex. 2)}$$

[Math. 3]

$$\text{angle\_site}_1 = \text{initial\_angle} \quad \text{(Ex. 3)}$$

It is to be noted that when Priority$_i$ is not set or even when Priority$_i$ is set, this site rendering position may be determined not based on the value of Priority$_i$, but according to a positional relationship between the receiving site and each of the transmitting sites. For example, in the case of the conference among the sites of Japan, the United States, China, and Australia, the site rendering positions in Japan may be such that signals from the US site are allocated on the east side, signals from China are allocated on the west side, and signals from Australia are allocated on the south side. It is also possible to determine the site rendering position according to the facility environment such as a positional relationship between the listening position 110 of the conference system and an image display device of the conference system. Furthermore, on the basis of information such as the dimensions of a conference room in a transmitting side site, the maximum distance between object signals may be determined in a receiving side site. Such information may be transmitted as the above-mentioned reset information or may be transmitted only when necessary. Such information as the positional relationship between sites and the facility environment in a site is defined as sound environment information. By thus determining the rendering position of a site based on the relationship between the participating sites in a conference or the environment of each site, it is possible to improve the sense of presence in the conference.

Next, the layout of the object signals grouped for each site is described. After the rendering angle and the rendering position for each site are determined using area_site$_i$ and angle_site$_i$, the object signals are virtually positioned within the area determined by the rendering angle and the rendering position for the site. For example, the object signals 101 to 104 in the site B shown in FIG. 3 are virtually positioned as 105 to 108 within a virtual space 109 of the site B in the receiving site D. This layout in a virtual space is set so that when each of the object signals has Priority$_i$, the object signal with a higher priority is placed close to the listening position or at a highly audible position. With such a layout, it is possible to make sound with a higher priority more audible among the object signals which are grouped for each site so as to make acoustic sound more distinguishable.

When, in the virtual space of a site, the rendered object signal is positioned close to a boundary of the area of the site, there is a short distance between the object signal and another object signal included in the area of an adjacent site, which makes it difficult to distinguish these areas of the sites. In such a case, the rendering unit 807 makes a modification so as to lower the sound volume of the object signal positioned close to the boundary of the area. For example, the object signal positioned close to the boundary of the area is cut in sound volume down to around 70% of the original sound volume of the object signal decoded by the object decoding unit.

As a method other than the above, it may also be possible to modify the rendering position of the object signal close to the boundary of the area so that an angle, with the listening position as the center, formed by the position of the object signal and the boundary of the area is a predetermined angle or more, for example, five degrees or more. Alternatively, it is also possible to compute the rendering position of the object signal within each area so that the object signal is included in the angle which is around 80% of the rending angle of the area, or to compute around 80% of the rendering angle of the area for each site and use the resultant as the rendering angle.

While, in the above description, the object signal positioned close to the boundary is cut in sound volume down to around 70%, or the angle formed by the object signal positioned close to the boundary and the boundary of the area is five degrees or more, or the rendering angle of each area is modified to around 80% of the calculated angle, the present invention is not limited to these figures. The specific figure for the sound volume modification, the modification angle from the boundary of the area, or the modification proportion of the rendering angle of each area may be set to such a value that the audibility of the object signal at the listening position is most appropriate, among, for example, various possible values given in a simulation or the like.

Furthermore, as another method of preventing object signals from being rendered close to the boundary of the area of each site, there is a method as follows. For example, it is also possible that the rendering angle area_site$_i$ of the virtual space for each site is divided by the figure (numObject_site$_i$+a) which is obtained by adding a predetermined constant α to the number of object signals included in the site numObject_site$_1$, and the object signals are sequentially rendered, according to priorities thereof, at positions from the front of the listening position, then on right and left sides thereof, which front indicates a direction connecting the listening position and the center of the area. For example, the object signal with the highest priority is rendered in front of the listening position and then, the object signal with the second highest priority is rendered at a position forming an angle (area_site$_1$)/(numObject_site$_1$+a) on the left side in front of the listening position. Subsequently, the object signal with the third highest priority is rendered at a position forming an angle (area_site$_i$)/(numObject_site$_i$+a) on the right side in front of the listening position, and the object signal with the fourth highest priority is rendered at a position forming an angle 2(area_site$_i$)/(numObject_site$_i$+a) on the left side in front of the listening position. In this case, it is preferable that the rendering be performed so that the object signals are away from the listening position farther by predetermined distances in descending order of priority. Thus, the rendering angle allocated to the virtual space for each site is divided by a value which is equal to or higher than the total number of object signals, and the rendering is performed so that the positions of the object signals are farther away in descending order of priority sequentially from the front of the listening position and right and left side thereof, which allows for a gap of an angle α(area_site$_i$)/2(numObject_site$_i$+a), that is, a space in which no object signals are positioned, on the inner side of either boundary.

This makes it possible to separate the areas of the sites in the virtual space with the boundaries around which the predetermined ranges are given, with the result that the areas of the sites can be more clearly distinguished auditorily, The conference system with a sense of presence according to the present embodiment is thus capable of providing a conference system which provides a sense of presence and highly audibly reproduces speech from the other sites.

It is to be noted that when Priority$_i$ is not set or when Priority$_i$ is set but such information is not used, the object signals 101 to 104 in the site B may keep their mutual relative positions when positioned in the virtual space. When the relative positions are thus kept, the sound source state in the site can be recreated in the virtual space. The relative positions of the object signals in the respective sites may be each multiplexed, as sound environment information from the site, with the coded object information and transmitted to the other sites. In this case, the relative positions of the object signals are represented by distances and angles of the object signals, as viewed from the listening position, which corresponds to the listening position of the site D, as a center that is a reference position from which a monitor is positioned at Π/2, for example. Needless to say, the representation of the relative positions of the object signals of each site is not limited to the above representation, and may use, for example, positional coordinates in the conference room of each site.

Figure 6:
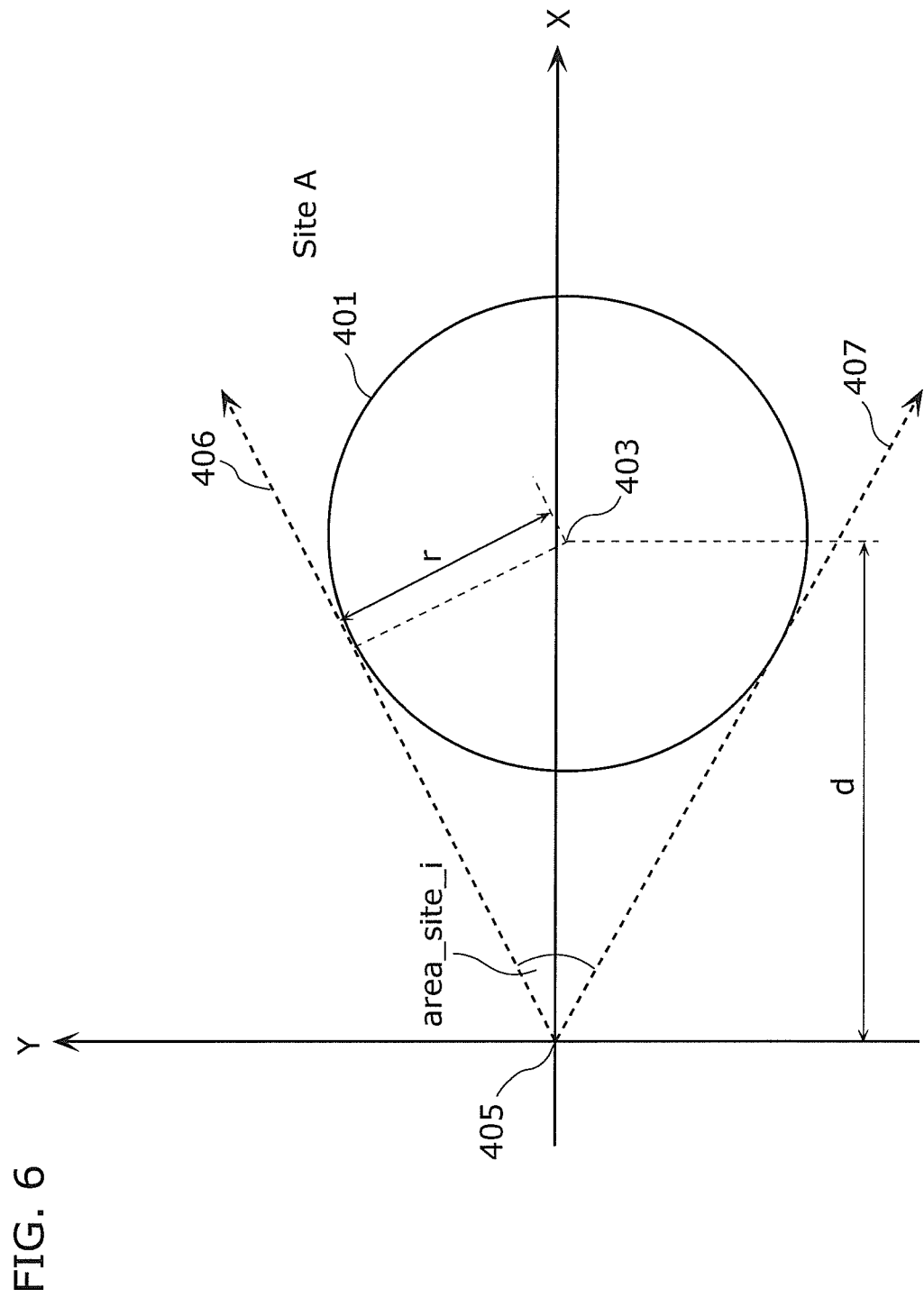
FIG. 6 shows a method of positioning a virtual space of a site in a receiving site.

The following describes another method of virtual positioning of the object signals with reference to FIG. 6 in addition to FIG. 4. The object signals transmitted from the same site are positioned in the area indicated by the rendering angle for the site around the listening position 110 as described above. In FIG. 6, the angle formed by an arrow 406 and an arrow 407 is the rendering angle for the site A, and the object signals transmitted from the site A are positioned in this area. A listening position 405 corresponds to the listening position 110 of FIG. 3, a virtual space 401 of the site A is a circle contacting the arrow 406 and the arrow 407, and 403 indicates the center point of the virtual space 401. Furthermore, d indicates the distance between the listening position 405 and the center point 403.

When virtually positioning the object signals grouped for each site in the listening space of the receiving side conference room, the object signals are positioned inside the virtual space 401. This is because positioning the object signals in the area as a set to some extent rather than at random makes it easier to auditorily distinguish the acoustic sound from one site to the acoustic sound from another, thereby improving the sense of presence in the conference. However, when the distance d is very small, the radius r of the virtual space 401 is also small, which means that the distance between the positioned object signals is small, making it very difficult to distinguish the acoustic sound. Inversely, when the distance d is very large, the radius r is also large, which means that the object signals are positioned away from the listening position 405, making the acoustic sound hard to hear. In addition, the distance between the positioned object signals becomes large, which makes it difficult to auditorily distinguish the areas of the object signals grouped for each site. In order to solve these problems, the shortest distance (threshold$_s$) and the longest distance (threshold$_l$) between the object signals are determined in the case where the object signals are evenly positioned on the circumstance of the virtual space 401. To be specific, the radius r$_i$ of each site is determined by Expression 4 (Step S124). With the determined radius r$_i$ and the allocated area_site$_i$, the distance d$_i$ between the center point 403 and the listening position 405 is also determined (Step S125). By thus setting the thresholds, it is possible to prevent problems of difficulties in distinguishing and hearing sound. While the shortest distance and the longest distance are set in this example, only the longest distance may be set in the case where the total number of object signals is very small in which the longest distance is more important than the shortest distance. The shortest distance and the longest distance may be set at such values among various possible values given in a simulation that the object signals in each site are appropriately positioned.

[Math. 4]

$$\text{threshold}_l \geq r_i \times \frac{2\pi}{\text{numObject\_site}_i} \geq \text{threshold}_s \quad \text{(Ex. 4)}$$

Figure 7:
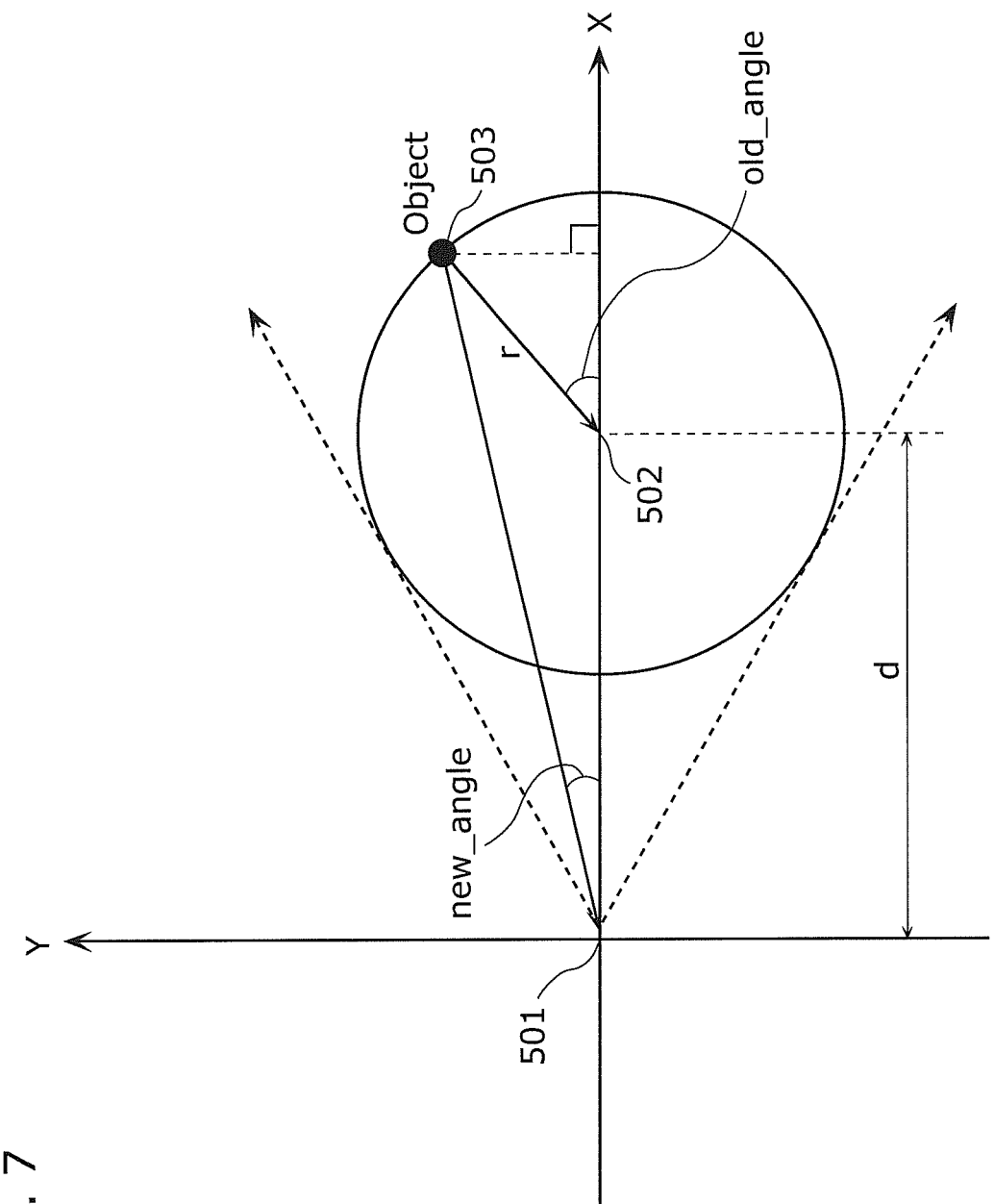
FIG. 7 is a layout of a predetermined object signal in a receiving site.

With reference to FIG. 7, the layout of the object signals is described further in detail. A listening position 501 in FIG. 7 indicates a listening position as denoted by 110 and 405 in the above description. The X axis is an axis which evenly divides the rendering angle for the site shown in FIG. 7, and the Y axis is an axis orthogonal to the X axis. A positioning angle of an object j in a virtual space for a site i is set at old_angle$_{ij}$. In the case where an object signal from the object j has Priority$_i$, the position of the object signal in the virtual space of the site i is determined based on the Priority$_i$. In the case where no Priority$_i$ is set or in the like case, the position is determined based on information such as the position of the object j in the site i or power of sound. The angle formed by the X axis and a line connecting the position 503 of the object j determined as above and the center point 502 of the virtual space of the site i is old_angle$_{ij}$. This old_angle$_{ij}$, the distance d between the listening position 501 and the center point of the virtual space of the site i, and the distance between the center point 502 and the position 503 of the object j are used to calculate an angle new_angle$_{ij}$ formed by the X axis (Step S126). With new_angle$_{ij}$ thus calculated and the rendering angle angle_site$_i$ for the site i, the positioning angle angle$_{ij}$ of the object j in the receiving site can be calculated by Expression 5 (Step S127).

[Math. 5]

$$angle_{ij} = new\_angle_{ij} + angle\_site_j \quad \text{(Ex. 5)}$$

As above, the object signals can be grouped and positioned for each site so that acoustic sound from one site can be easily auditorily distinguished from the acoustic sound from another site (Step S128). While a shape of the area of each site in the virtual space in the above description is a circle as shown in FIG. 3, FIG. 5, FIG. 6, and FIG. 7, the shape is not limited to a circle and may be any shape, for example, an ellipse or the like shape, as long as areas of the shape can be easily distinguished from one site to another. Furthermore, the object j is is positioned on the circumstance of the circle in FIG. 7, but may of course be positioned within the virtual space.

Figure 8:
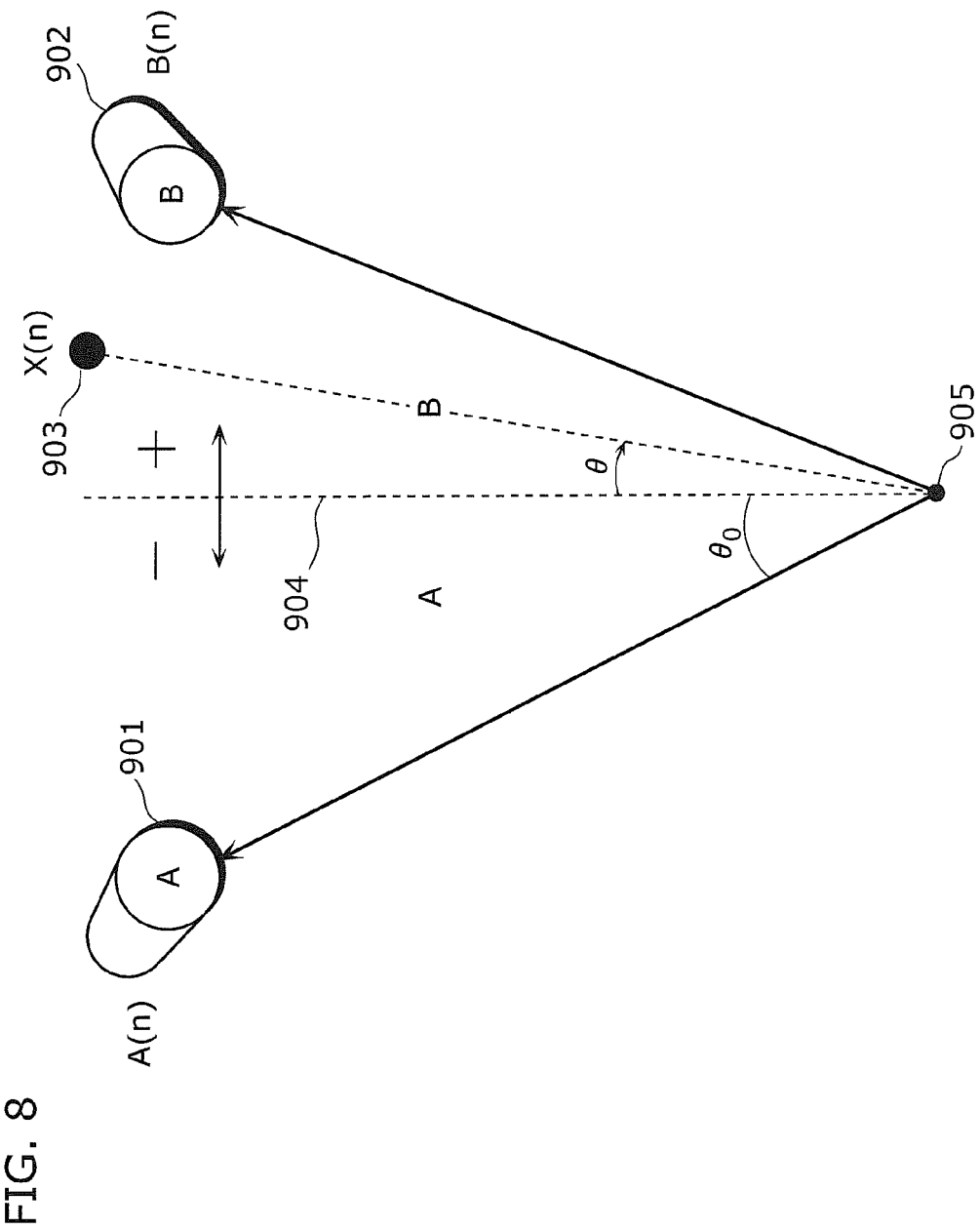
FIG. 8 shows an example of a rendering process in a stereo system.

Next, the process of rendering each object signal of each site is described with reference to FIG. 8. In FIG. 8, a speaker A 901 and a speaker B 902 are each a stereo speaker. A listening position 905 corresponds to the listening position 110, etc. and indicates a certain point in the site in which point the sound is audible, such as a listener's position or the center position of listeners in the receiving site, or the center of the conference room of the site. As shown in FIG. 8, a line segment 904 passes through the listening position 905 and is a bisector of an angle formed between the speaker A 901 and the speaker B 902. An angle $\theta_0$ indicates an angle formed between the line segment 904 and the speaker A 901. The angle $\theta_0$ is determined by positions and orientations of the speaker A 901 and the speaker B 902.

A method of virtually creating an acoustic signal source 903 in a direction as indicated in FIG. 8 with use of the speaker A 901 and the speaker B 902. In the case as shown in FIG. 8, an angle $\theta$ of an acoustic signal on the speaker B side has a positive value and an angle $\theta$ of an acoustic signal on the speaker A side has a negative value. The angle $\theta$ is calculated from the listening position 905 and the desirable position of the acoustic signal source 903 obtained as above, at which each object signal is to be positioned. In the figure, X(n) represents a signal from the acoustic signal source 903, A(n) represents an acoustic signal from the speaker A 901, and B(n) represents an acoustic signal from the speaker B 902. By adjusting net energy of the speaker A 901 and the speaker B 902, a stereo speaker system as shown in FIG. 8 can simulate an acoustic space for the acoustic signal source 903. Specific energy adjustment of the speaker A 901 and the speaker B 902 is performed so as to satisfy the following expression 6.

[Math. 6]

$$\begin{cases} A(n) = aX(n) \\ B(n) = bX(n) \end{cases}, \quad a^2 + b^2 = 1 \quad \text{(Ex. 6)}$$

In this case, for example, when $\theta=\theta_0$, parameters a and b are determined as a=0 and b=1 because the acoustic signal source 903 and the speaker 902 are in the same direction. Likewise, when $\theta=-\theta_0$, the parameters are determined as a=1 and b=0, and when $\theta=0$, the following equation is obtained.

[Math. 7]

$$a = b = \frac{1}{\sqrt{2}}$$

When generalized, the parameters a and b can be represented by Expression 7 using $\theta$ and $\theta_0$ (refer to Non Patent Literature 1).

[Math. 8]

$$\frac{a}{b} = \frac{\sin\theta_0 - \sin\theta}{\sin\theta_0 + \sin\theta} \quad \text{(Ex. 7)}$$

In the method as above, a virtual sound source corresponding to the transmitted object signal can be created in the receiving site.

Figure 9:
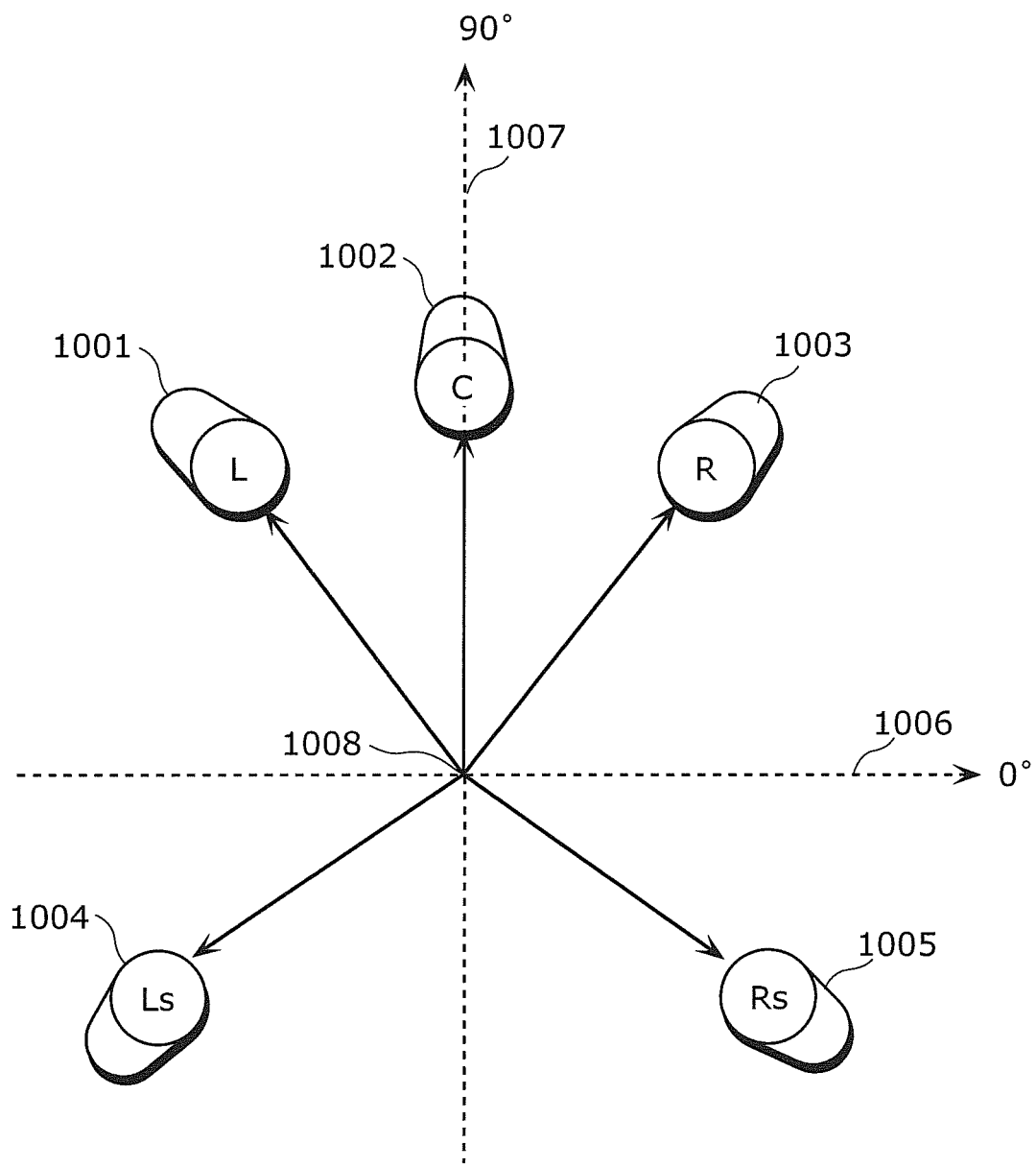
FIG. 9 shows a configuration of a 5.1 ch surround system.

The following describes, with reference to FIG. 9, an example of the rendering process with a 5.1 ch acoustic system in the receiving site. A rendering matrix can be created from layout information of entire object signals from all the sites other than the receiving site, in the manner as described with reference to FIG. 7. Numerals 1001 to 1005 indicate a front left speaker L, a front center speaker C, a front right speaker R, a rear left speaker Ls, and a rear right speaker Rs, respectively, in the receiving site. A center line 1007 extending in a front-back direction indicates a line passing through the front center speaker C 1002 and a listening position 1008, and a center line 1006 extending in a right-left direction indicates a line orthogonal to the center line 1007 extending in the front-back direction. In this 5.1 ch system, each object signal is rendered by the following steps.

Step 1: A Speaker for Rendering Each Object Signal is Determined.

A virtually created acoustic signal source is positioned so that an angle formed by each object signal and the center line 1006 extending in the right-left direction becomes an $angle_d$ determined in the above method. The distance between the listening position 1008 and each acoustic signal source is determined based on Priority$_i$ if it is set, or based on the positional relationship or the like if Piroirty$_i$ is not set. Each acoustic signal source positioned in an area of acute angle formed by two adjacent ones of the speakers 1001 to 1005 and the listening position 1008 is virtually created by the two speakers. FIG. 9 shows a two dimensional representation of a spatial layout of the five speakers positioned around the listening position 1008. The direction indicated by the arrow 1006 is 0°, and the speakers 1001 to 1005 are positioned at 120°, 90°, 60°, 210°, and 330°, respectively. Accordingly, for an acoustic signal source in the area between the speaker Rs 1005 and the speaker R 1003, a rendering angle $angle_{ij}$ for the corresponding object signal is represented by Expression 8.

[Math. 9]

$$-30° \leq angle_{ij} \leq 60° (0° \leq angle_{ij} \leq 60° \vee 330° \leq angle_{ij} \leq 360°) \quad \text{(Ex. 8)}$$

This also applies to the other adjacent pairs of the speakers. For example, in the case where the $angle_{ij}$ of an object signal corresponding to an acoustic signal source is 10°, the speaker Rs 1005 and the speaker R 1003 are selected for rendering.

Step 2: A Rendering Coefficient for Each Object Signal is Calculated.

According to the above method described with reference to FIG. 8, an acoustic signal source is virtually created with the two speakers selected in Step 1. For example, in the case where the $angle_{ij}$ of an object signal corresponding to an acoustic signal source which is to be created is 10°, the speaker R 1003 corresponds to the speaker A 901 of FIG. 8 and the speaker Rs 1005 corresponds to the speaker B 902 of FIG. 8. The rendering coefficient is calculated using Expression 2, half the angle formed by 1003 and 1005, that is, 45° (=$\theta_0$), and the $angle_{ij}$ (=$\theta$). The rendering coefficient represents a and b in Expression 6, and in this case, a corresponds to the rendering coefficient for the speaker R 1003 and b corresponds to the rendering coefficient for the speaker Rs

1005. The rendering coefficients for the other speakers are set at 0. Specifically, when the matrix of the rendering coefficients for the speakers 1001 to 1005 is represented by [L, C, R, Ls, Rs], the matrix of the rendering coefficient for the object signal having angle$_{ij}$ of 10° is [0, 0, a, 0, b] (≈[0, 0, 0.518, 0, 0.855]).

Thus, using the 5.1 ch reproduction system, it is possible to virtually create the acoustic signal source of each object signal in the receiving space. The reproduction system is not limited to the 5.1 ch reproduction system and may be a multichannel reproduction system such as a 7.1 ch reproduction system and may also be a virtual acoustic space which is obtained by convolution of a head related transfer function (HRTF) using the 2 ch reproduction system.

When the object coding technique for controlling rendering is used as above, the spatial layout of acoustic signals on the receiving site side can be controlled freely. Furthermore, the present invention makes it possible, for example, to provide a spatial layout in which an important speaker is given a large area in the acoustic space so that a listener can auditorily perceive that a speech of the speaker is important. It is thus possible to produce advantageous effects of improvement in a sense of presence in a conference by providing a is layout which is appropriate to interests for the site participating in the conference system, such as the relationship between the object signals.

Second Embodiment

A conference system in the present embodiment also has a structure as shown in FIG. 1, as in the case of the first embodiment. As the detail of the structure is the same as described above, the following describes another method of setting Priority$_i$ and another rendering method in the rendering unit 807.

Priority$_i$ indicating the priority of each site or each object signal may be obtained by transmission of a request or the like to the multipoint control unit 805. In the transmitting site, which merely transmits coded information, the priority of each site or the priority of each object signal in the whole is not known. When the multipoint control unit 805 has received the coded object information from all the sites, the priorities are judged and determined. This determination is performed by measuring an activity level of each site, for example. This activity level is set so that a site which has transmitted the coded object information more times per a certain time period (for example, an hour) is given a higher activity level. Thus, a site which transmits the information less frequently per a certain time period is determined as a site which often remains silent, and therefore is set to have a lower activity level, and according to the set activity level, the priority of each site or each object signal is determined. This setting enables an efficient rendering process in which a site or an object signal that is important in the conference at the moment can be given an increased priority. In the above description, the time interval for calculating the activity level, determining the priority of the object signal, and controlling the rendering unit, is not limited to one hour and may be 30 minutes, 2 hours, or any given length of time. Furthermore, the multipoint control unit 805 measures the activity level of each site in the above description, but the present invention is not limited to that. For example, the object decoding unit 806 in each site may count, for each site, the number of bits (=code length) of the coded object information received per unit of time, and this counted number may be used as the activity level to determine the priority of each site.

This however does not deny performing rendering without priorities obtained or rendering according to not the obtained priorities but the priorities set in the decoding device in the site. For example, in the case of a conference system without MCU and in the case where the priority is desired to be set on the site side, a rendering layout may be set using the User Information of FIG. 1 depending on circumstances. Such determining and setting of the priority on the site side allows for rendering more customized to listeners.

Next, another rendering method in the rendering unit 807 is described. As described above, the rendering angle area_site$_i$ for each site can be calculated using the total number numObject_site$_i$ of object signals. The calculation may also be performed using not the total number but the number of effective objects active_numObject_site$_i$ as indicated in Expression 9. This is because even when a certain site has a large number of participants, voices of a small number like one or two of the participants are important while the other participants are basically audiences and their voices may possibly be irrelevant to the conference. In such a case, if the rendering angle for the site is calculated based on the number of object signals, a large virtual space will be allocated to the site in a receiving site, for those object signals which are not so needed to be transmitted. The calculation of the rendering angle using the number of effective object signals as in Expression 9 therefore makes it possible to acoustically efficiently position important object signals in a receiving site and thereby provide a conference system which is natural and meaningful. In order to provide a receiving site with a virtual conference environment which is more comfortable with a sense of presentation, the value of active_numObject_site$_i$ may not be constant and dynamically change based on a change in power of the object signals or the like.

[Math. 10]

$$\text{area\_site}_i = \frac{2\pi}{\sum_{j=1}^{numSite} \text{active\_numObject\_site}_j} \times \text{active\_numObject\_site}_i \quad \text{(Ex. 9)}$$

The rendering angle for each site may thus be determined according to the values of numObject_site$_i$ and active_numObject_site$_i$ and may also be determined by Expression 10 when each site has Priority$_i$. Herein, a larger value of Priority$_i$ indicates a higher priority. Recommended priority ranks to keep the number of bits from becoming too large are 1 to 3. The highest priority is 3 and the lowest priority is 1.

[Math. 11]

$$\text{area\_site}_i = \frac{2\pi}{\sum_{j=1}^{numSite} \text{priority}_j} \times \text{priority}_i \quad \text{(Ex. 10)}$$

A listener in a receiving site, a system manager, etc. selects either Expression 9 with numObject_site$_i$ and active_numObject_site$_i$ or Expression 10 with Priority$_i$, to calculate the rendering angle for each site. This selection is made by inputting to the rendering unit 807 the User Information of FIG. 1 which includes the selection.

Next, with reference to FIG. 5, a method of determining the rendering position angle_site$_i$ of each site based on its priority is described. Positioning based on the priority means positioning the object signals grouped for a site with a higher priority, at a more audible position. First, sites are rearranged so that the priority becomes lower as the index i is larger. An initial value is then set to the most audible position, and all the sites are positioned using Expressions 11 and 12.

[Math. 12]

$$\text{angle\_site}_i = \quad \text{(Ex. 11)}$$
$$\text{angle\_site}_{i-2} + (-1) \times i \times \left(\frac{1}{2}\text{area\_site}_{i-2} + \frac{1}{2}\text{area\_site}_i\right),$$
$$(2 \le i \le \text{numSite}),$$

[Math. 13]

$$\text{angle\_site}_0 = \text{initial\_angle} \quad \text{(Ex. 12)}$$
$$\text{area\_site}_0 = \text{area\_site}_1.$$
$$\text{angle\_site}_1 = \text{initial\_angle}$$

In FIG. 5, the sites are rearranged, starting from the site 1, in a manner that the priority becomes lower as the index i is larger. Next, when the most audible position is front, initial_angle is set at 90 degrees. Using Expression 12, angle_site$_1$ is determined as 90 degrees, and the site 1 with the highest priority is positioned in front. The site 2 with the second highest priority is positioned on the left side of the rendering area of the site 1. The site 3 with the third highest priority is positioned on the right side of the rendering area of the site 1. Subsequently, sites with even-numbered priorities are subsequently positioned on the left side while sites with odd-numbered priorities are subsequently positioned on the right side. Such positioning allows acoustic sound from a site with a higher priority to be placed at a position more audible to a participant in a receiving site. While a site with even-numbered priority is positioned on the left and a site with odd-numbered priority is position on the right in the above description, the site layout is not limited to the above example and any other methods may be used as long as a site with a higher priority can be placed at a more audible position.

The object signals grouped for a site are positioned as described in the first embodiment with reference to FIG. 6. In the above example, the thresholds, i.e., the shortest distance (threshold$_s$) and the longest distance (threshold$_l$) between the object signals are determined using Expression 4, but the thresholds may be of a distance d$_i$ between the listening position 405 and the center point of the virtual space. This can prevent the problem of difficulties in distinguishing and hearing sound, as in the case of the above-described example.

Figure 10:
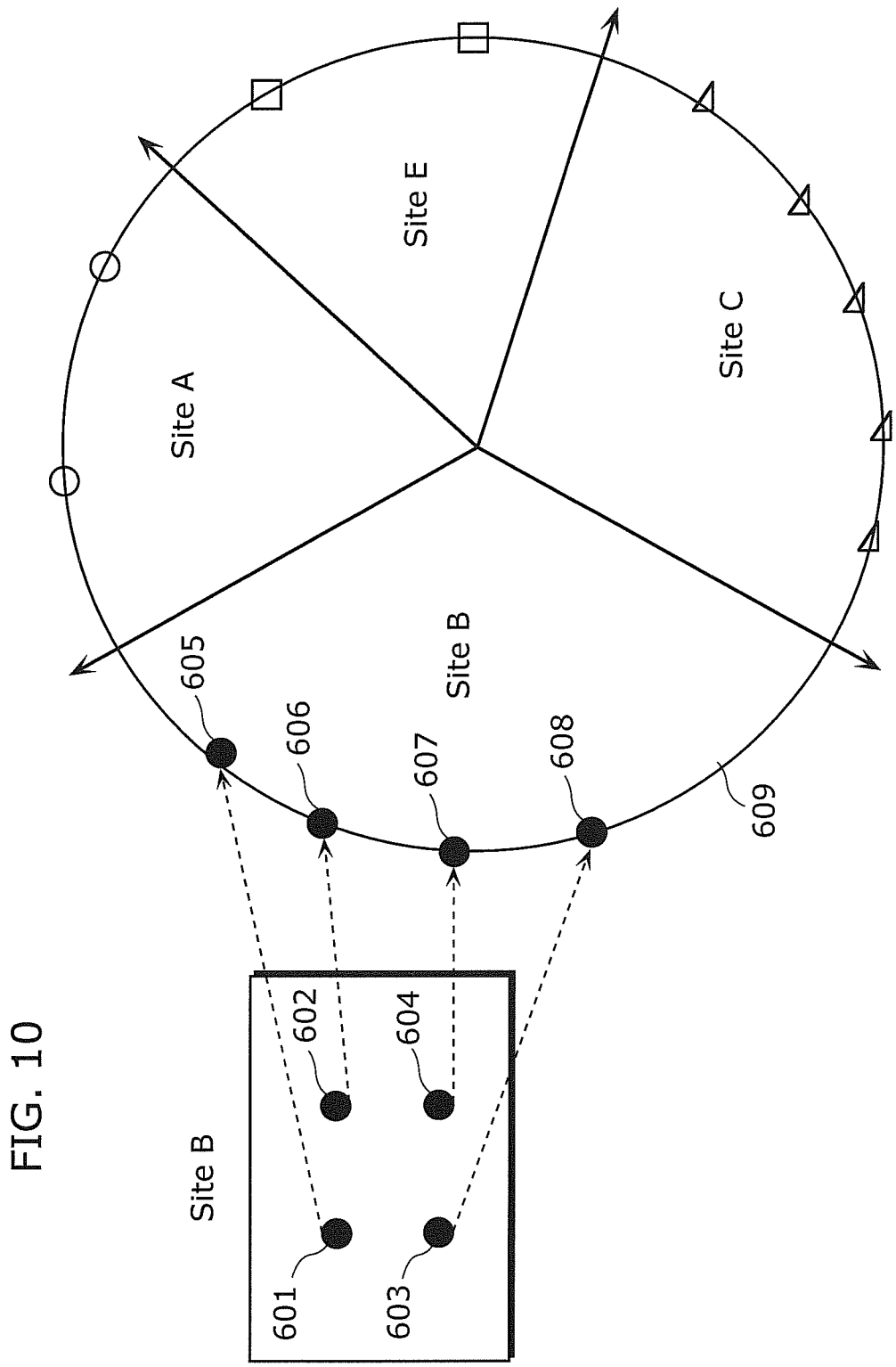
FIG. 10 is a geometric layout of object signals in a receiving site.

Next, the layout of object signals for each site is described with reference to FIG. 10. FIG. 10 shows a layout example of entire object signals from the sites other than the receiving site. As shown in FIG. 10, not depending on the positional relationship of objects in each site, the object signals may be positioned in an area which is indicated by the rendering angle for each site and included in a virtual space 609 having a listening position 610 as the center. For example, the object signals 601 to 604 of the site B are positioned, regardless of their relative positions in the site B, as 605 to 608 in the area which is indicated by the rendering angle for the site B and included in the virtual space 609. Such circular positioning makes the distances from the listening position to the virtual object signal sources the same, thereby allowing a listener to catch the sound equally.

This virtual space 609 is not limited to the circular shape and may be other geometric shapes such as a square, a rectangle, a triangle, and a hexagon. The shape may be determined so that distances from the listening position 610 are different depending on the priorities of the objects. Positioning in a geometric shape enables efficient rendering by positioning more important object signals closer to the listening position according to the priorities.

As a matter of course, whichever shape the object signals are positioned in, they are grouped for each site and thus each positioned in the rendering area of the corresponding site, which makes it easy to distinguish the acoustic sound from one site to another. As mentioned above, the priorities may be set on the receiving site side, and it is therefore possible to move the positions of the entire sites by optimizing a parameter through a coordinate transformation or the like so as to suit the preferences of a listener. Thus, in the present embodiment, the priority information Priority$_i$ of sites or object signals and the number of object signals of each site numObject_site$_i$ are introduced, with the result that rendering of the object signals can be performed automatically.

As described above in the first and second embodiments, the present invention allows for such rendering that, when a large number of sites are connected, the relative positions of object signals of each transmitting site are maintained. Furthermore, it is possible to make the acoustic sound auditorily distinguishable from one site to another by positioning the object signals for each site within a certain range of the area. Moreover, by controlling the rendering angle, the rendering distance, or the like of the object according to the priority, the number of objects, or the like, it is possible to perform rendering in turns based on the priority so that sound of a site or object signal with a higher priority is more audible. The present invention thus enables improvement in speech intelligibility in conferences.

Third Embodiment

Figure 11:
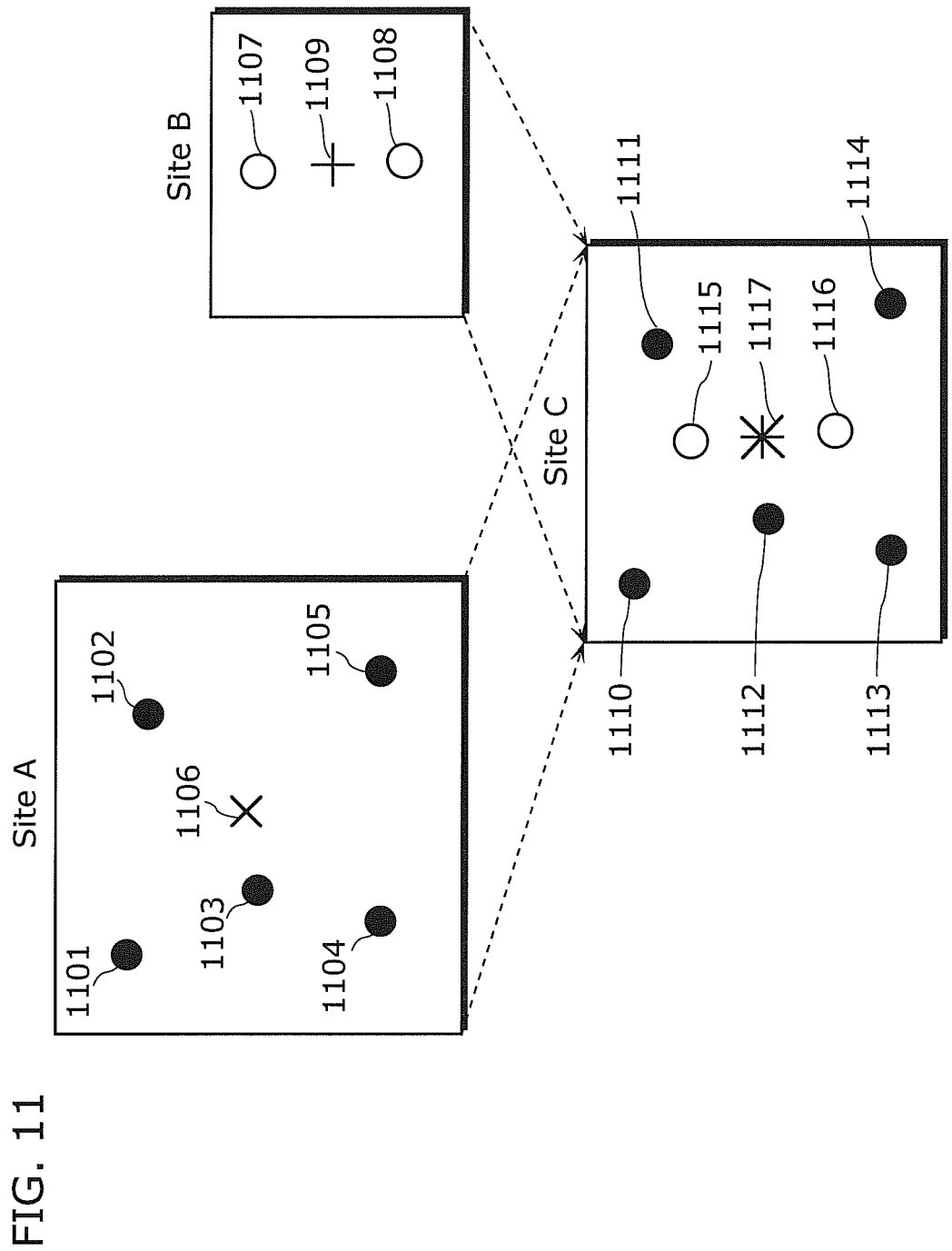
FIG. 11 shows a rendering method according to the third embodiment.

The rendering unit 807 may perform rendering as shown in FIG. 11 as an alternative to virtual grouping of the object signals transmitted from the participating sites as shown in FIG. 3. FIG. 11 shows that rendering is performed so as to match the center position of an acoustic space of each participating site. This center position is the center of a conference room of each site or a position of sound pickup equipment such as a microphone, etc. Such rendering as to match the center position of each site in a receiving site can generate a situation in which the acoustic space of each site overlaps with the virtual acoustic space on the receiving site.

For example, assume that a certain site A is a large conference room and another site B is a small conference room, then in a receiving site, the virtual acoustic space for the acoustic signals transmitted from the site A will be rendered in a wide range while the virtual acoustic space for the acoustic signals transmitted from the site B will be rendered in a narrow range, with the result that the size or acoustic space situation of each site can be felt on the receiving site side. With this structure, extents of acoustic spaces of respective participating sites can be reproduced relatively in a receiving site, which produces an effect of improving a sense of presence in a conference.

Fourth Embodiment

Figure 12:
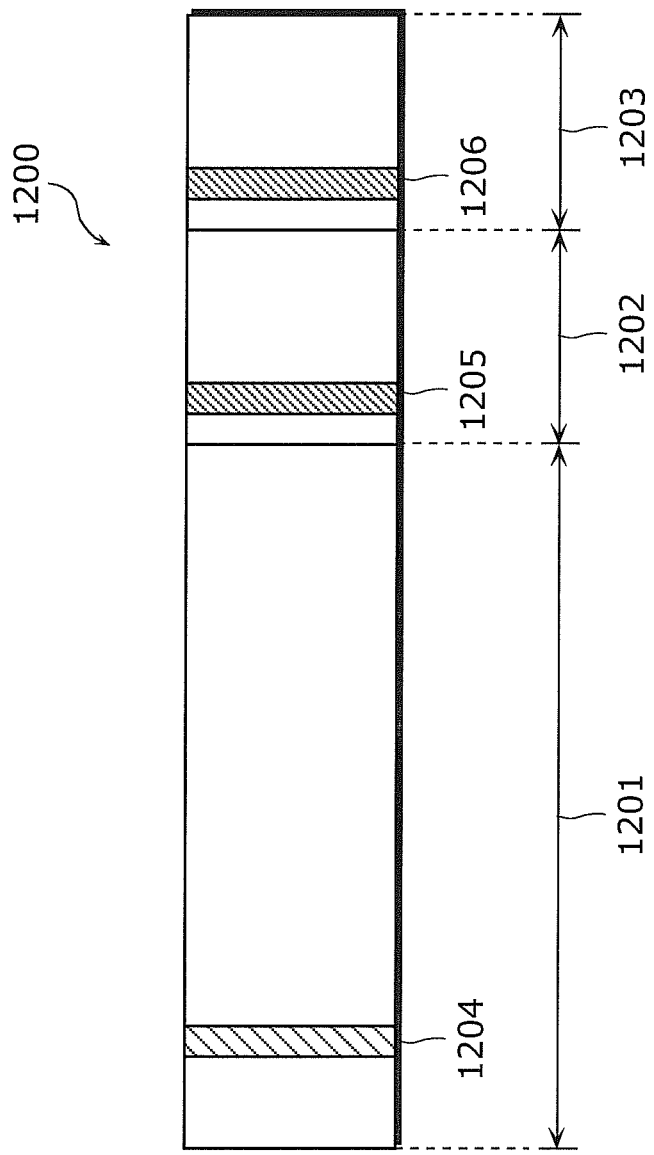
FIG. 12 shows a data structure of coded object information according to the fourth embodiment.

FIG. 12 shows a data structure of coded object information according to the fourth embodiment. As shown in FIG. 12, coded object information 1200 includes down-mixing information 1201 and object information 1202 and 1203 for decoding each object signal using the down-mixing information 1201. The object information 1202 and 1203 each include gain ratio information (OLD) or phase difference information (IOC) between object signals. For example, this gain ratio information is represented by a ratio of each object signal to the down-mixing information 1201. The down-mixing information 1201 includes global gain information 1204 indicating a gain of the down-mixing information. When this coded object information 1200 is decoded by the object decoding unit, the global gain information 1204 included in the down-mixing information 1201 and the gain ratio information (OLD) 1205 and 1206 of object signals can be used to determine priorities. Although the above gain information generally does not indicate a priority, a large gain of the down-mixing information or a large product of a value of gain ratio included in the object information and gain information included in the down-mixing information, which product implicitly indicates a value of gain of the object signal decoded using the down-mixing information and the object information, indicates that the object signal is acoustically large, and there is a possibility that a larger acoustic signal has a higher priority, which means that the gain information and the priority are correlated to some extent. Thus, in view of this correlation, assuming that the global gain information 1204 of the down-mixing information 1201 indicates a representative priority of the site, the gain ratio information (OLD) 1205 and 1206 included in the respective object information 1202 and 1203 may each be interpreted as indication of priority for each object signal. By so doing, the value of "(gain of down-mixing information)*(gain ratio between object signals)" is calculated in the decoding device or MCU, and according to the rank of the value, priorities of all the object signals can be calculated. On the basis of the priorities thus calculated, the rendering unit 807 in the present embodiment is capable of automatically rendering each object in a virtual space according to the priorities.

As above, in the rendering unit 807 in the present embodiment, the priority is determined using a structure of the coded object information 1200 having a separate gain ratio of object signals for each object, with the result that the load for calculating the priority can be reduced, thus allowing a reduction in the decoding load on the decoding device. Furthermore, in the case where the decoding device has low operation performance, it is possible that an object signal determined as having a lower priority than a predetermined value among the priorities determined in the above method is not decoded so as to reduce the processing load of the rendering unit 807. In this case, the predetermined value is a value determined according to the operation performance of the decoding device.

In the above method of determining a priority according to the global gain information of the down-mixing information and the gain ratio between the object signals, sequential controls on the rendering on a frame basis may frequent change the priorities of the object signals and sites and further change the object reproduction areas positioned by the above rendering method, which makes sound uncomfortable to hear. In such a case, it is therefore preferable to prevent sensitive changes in the priorities (in the rendered reproduction areas) by smoothing/averaging the global gain information and the gain ratio information over multiple frames and thus controlling the rendering according to such an average value.

When an object is rendered close to a boundary of an area where object signals are automatically rendered, an increase in sound volume of the object makes the rendering boundary unclear, which may cause a failure to precisely exert an effect of the present invention. The clarity of the rendering boundary and the sound volume of the object rendered close to the boundary are correlated and therefore, in order to clarify the rendering boundary, the sound volume of an object signal around a boundary is lowered.

(Other Variations)

Although the present invention has been explained based on the above embodiments, it is a matter of course that the present invention is not limited to the above embodiments. The present invention also includes the following.

(1) The above devices are specifically computer systems each including a microprocessor, a read only memory (ROM), a random access memory (RAM), a hard disk unit, a display unit, a key board, a mouse, and so on. The RAM or hard disk unit stores a computer program. The microprocessor operates according to the computer program, thereby allowing each of the devices to accomplish its functions. The computer program herein is made of a combination of multiple command codes which indicate instructions to a computer in order to accomplish predetermined functions.

(2) It may also be possible that part or all of the components included in each of the above devices are provided in one system LSI (large scale integration). The system LSI is a super multifunctional LSI manufactured by integrating multiple components into one chip and is specifically a computer system which includes a microprocessor, a ROM, a RAM and so on. The RAM stores a computer program. The microprocessor operates according to the computer program, thereby allowing the system LSI to accomplish its functions.

(3) Part or all of the components included in each of the above devices may be in form of an integrated circuit (IC) card detachable from each of the devices or in form of a single module. The IC card or module is a computer system including a microprocessor, a ROM, a RAM, and so on. The IC card or module may include the above super multifunctional LSI. The microprocessor operates according to the computer program, thereby allowing the IC card or module to accomplish its functions. This IC card or module may have tamper resistance.

(4) The present invention may be a method described above. Furthermore, the present invention may be a computer program which causes a computer to execute the method or may be a digital signal of the computer program.

Furthermore, the present invention may be a computer-readable recording medium on which the computer program or the digital signal are recorded. The computer-readable recording medium includes, for example, a flexible disk, a hard disk, a CD-ROM, an MO, a DVD, a DVD-ROM, a DVD-RAM, a BD (Blu-ray Disc), and a semiconductor memory. The present invention may also be a digital signal recorded on the recording medium.

Furthermore, the present invention may be transmission of the computer program or the digital signal via a network represented by a telecommunication line, a wired or wireless communication line, and the Internet, or data broadcasting, etc.

Furthermore, the present invention may be a computer system including a memory which stores the above computer program and a microprocessor which operates according to the computer program.

Furthermore, the program or digital signal may be recorded on the recording medium and thus transmitted, or the program or the digital signal may be transmitted via the network or the like, so that the present invention can be implemented by another independent computer system.

(5) The above embodiments and the above variations may be combined.

The present invention is useful for a multi-site conference system in which multiple sites are connected through communication pathways and each of the sites is coded on an object basis.

REFERENCE SIGNS LIST 101, 102, 103, 104 Object signal (generated in site B)
105, 106, 107, 108 Object signal in virtual space of site B in receiving site D
109, 609 Virtual space of site B in receiving site D
110, 405 Listening position (of receiving site D)
401 Virtual space (of site A)
403 Center point (of 401)
404 Center point (of 402)
406, 407 Arrows (which form virtual space of site A in receiving site D)
501 Listening position
502 Center point (of virtual space)
503 Position (in virtual space of object j)
601, 602, 603, 604 Object signals of site B
605, 606, 607, 608 Object signal in virtual space of site B in receiving site D
609 Virtual space (in receiving site D)
610 Listening position (of receiving site D)
801 Sound pickup unit
802 Conference of site A
803 Separation unit
804 Object coding unit
805 Multipoint control unit
806 Object decoding unit
807 Rendering unit
808 Conference of site B
809 Coded object information A transmitted from Site A
810 Coded object information B transmitted from Site B
811 Coded object information C transmitted from Site C
812 Synthesized coded object information
901 Speaker A
902 Speaker B
903 Positioning point
904 Line segment
905 Listening position
1001 Front left speaker L
1002 Front center speaker C
1003 Front right speaker R
1004 Rear left speaker Ls
1005 Rear right speaker Rs
1006 Center line in right-left direction
1007 Center line in front-back direction
1008 Listening position
1101 Position of object signal 1 in site A
1102 Position of object signal 2 in site A
1103 Position of object signal 3 in site A
1104 Position of object signal 4 in site A
1105 Position of object signal 5 in site A
1106 Center position in site A
1107 Position of object signal 6 in site B
1108 Position of object signal 7 in site B
1109 Center position in site B
1110 Position of object signal 1 in site C
1111 Position of object signal 2 in site C
1112 Position of object signal 3 in site C
1113 Position of object signal 4 in site C
1114 Position of object signal 5 in site C
1115 Position of object signal 6 in site C
1116 Position of object signal 7 in site C
1117 Center position of site A and site B in receiving site C
1200 Coded object information
1201 Down-mixing information
1202, 1203 Object information
1204 Global gain information
1205, 1206 Gain ratio information (OLD)

The invention claimed is:

1. A decoding device, comprising:
an object decoding circuit which receives a plurality of pieces of coded acoustic information that was coded on an object basis and decodes the received coded acoustic information on an object basis to generate an acoustic signal from each piece of the coded acoustic information, the acoustic signal resulting from synthesizing one or more object signals; and
a rendering circuit which positions, for each acoustic signal generated, a virtual sound source in a predetermined listening space, the virtual sound source being associated with one of the object signals included in the generated acoustic signal,
wherein priority information indicating a priority of the acoustic signal is multiplexed with the coded acoustic information, and the rendering circuit determines, according to the priority indicated in the priority information, a size of an area of the predetermined listening space which is allocated to the acoustic signal, and positions, within the area allocated to the acoustic signal, the virtual sound source of each of the object signals included in the acoustic signal, the priority information is global gain information indicating a gain of down-mixing information in the object-based coding, and the priority is proportional to the gain, the coded acoustic information includes gain ratio information indicating a gain ratio of each of the object signals to the down-mixing information, and the object decoding circuit calculates, for each of the object signals, a product of a value of the global gain information and a value of the gain ratio information, and provides a value of the calculated product as second priority information for each of the object signals, and
wherein each of the object signals is associated with one sound source in an acoustic space in which the coded acoustic information is coded on an object basis,
the acoustic signal is a signal resulting from synthesizing the one or more object signals generated in the acoustic space, and
the rendering circuit determines the size of the area so that a larger area is allocated to the acoustic signal with a higher priority.

2. The decoding device according to claim 1,
wherein the object decoding circuit decodes only an object signal with a priority equal to or higher than a predetermined rank, and does not decode the object signal if the priority of the object signal is lower than the predetermined rank, the object signal being included in the acoustic signal, and the priority of the object signal being indicated in the second priority information.

3. The decoding device according to claim 1,
wherein the object decoding circuit assigns a rank of priority only to an object signal with a priority equal to or higher than a predetermined rank, and assigns a uniform rank of the priority of the object signal that is lower than the predetermined rank to the object signal if the priority of the object signal is lower than the predetermined rank, the object signal being included in the acoustic signal.

4. The decoding device according to claim 1,
wherein the rendering circuit positions the area allocated to the acoustic signal so that the area becomes closer to a predetermined front direction of a listening position as the priority indicated in the priority information for the acoustic signal increases.

5. The decoding device according to claim 1, wherein information indicating a relative positional relationship between acoustic spaces is multiplexed with each piece of the coded acoustic information, and the rendering circuit positions an acoustic signal around a predetermined listening position according to the information indicating the positional relationship.

6. The decoding device according to claim 1, wherein the rendering circuit determines a position of a virtual source corresponding to each of the object signals so that the virtual source corresponding to an object signal becomes closer to a listening position as the apriority of the object signal indicated in the second priority information increases.

7. The decoding device according to claim 1, wherein each piece of the coded acoustic information includes relative positional information indicating a relative position of a sound source of each of the object signals to a predetermined reference position in an acoustic space, and the rendering circuit calculates a position, in the predetermined listening space, of a virtual sound source of each of the object signals, from the relative position indicated in sound environment information, using, as the predetermined reference position, a predetermined position in the area allocated to each of the acoustic signals, and places the virtual sound source of an object signal in a calculated position.

8. The decoding device according to claim 1, wherein each of the object signals is associated with a voice of one speaker in the acoustic space.

9. A decoding device, comprising:
an object decoding circuit which receives a plurality of pieces of coded acoustic information that was coded on an object basis and decodes the received coded acoustic information on an object basis to generate an acoustic signal from each piece of the coded acoustic information, the acoustic signal resulting from synthesizing one or more object signals; and
a rendering circuit which positions, for each acoustic signal generated, a virtual sound source in a predetermined listening space, the virtual sound source being associated with one of the object signals included in the generated acoustic signal,
wherein priority information indicating a priority of the acoustic signal is multiplexed with the coded acoustic information, and the rendering circuit determines, according to the priority indicated in the priority information, a size of an area of the predetermined listening space which is allocated to the acoustic signal, and positions, within the area allocated to the acoustic signal, the virtual sound source of each of the object signals included in the acoustic signal,
each piece of the coded acoustic information includes identification information for specifying, an acoustic space,
the object decoding circuit (i) measures, for each piece of the identification information, a code length of the coded acoustic information received per unit time, (ii) sets the code length of the coded acoustic information measured per unit time, as an activity level of the acoustic space specified using the identification information, and (iii) determines, for each acoustic space, the priority of the acoustic signal based on the priority information and the activity level, and the rendering circuit determines the size of the area which is included in the acoustic space specified using the identification information and allocated to the acoustic signal so that the area becomes larger as the priority determined for each piece of the identification information increases and wherein each of the object signals is associated with one sound source in the acoustic space in which the coded acoustic information is coded on an object basis,
the acoustic signal is a signal resulting from synthesizing the one or more object signals generated in the acoustic space, and
the rendering unit determines the size of the area so that a larger area is allocated to the acoustic signal with a higher priority.

10. A decoding device, comprising:
an object decoding circuit which receives a plurality of pieces of coded acoustic information that was coded on an object basis and decodes the received coded acoustic information on an object basis to generate an acoustic signal from each piece of the coded acoustic information, the acoustic signal resulting from synthesizing one or more object signals; and
a rendering circuit which positions, for each acoustic signal generated, a virtual sound source in a predetermined listening space, the virtual sound source being associated with one of the object signals included in the generated acoustic signal,
wherein priority information indicating a priority of the acoustic signal is multiplexed with the coded acoustic information, and the rendering circuit determines, according to the priority indicated in the priority information, a size of an area of the predetermined listening space which is allocated to the acoustic signal, and positions, within the area allocated to the acoustic signal, the virtual sound source of each of the object signals included in the acoustic signal, and
the object decoding circuit determines the priority of the acoustic signal for each acoustic space so that the priority increases as the object signals included in the acoustic signal increases in number, and
wherein each of the object signals is associated with one sound source in the acoustic space in which the coded acoustic information is coded on an object basis,
the acoustic signal is a signal resulting from synthesizing the one or more object signals generated in the acoustic space, and
the rendering unit determines the size of the area so that a larger area is allocated to the acoustic signal with a higher priority.

11. A decoding method, comprising:
an object decoding step of receiving a plurality of pieces of coded acoustic information that was coded on an object basis and decoding the received coded acoustic information on an object basis to generate an acoustic signal from each piece of the coded acoustic information, the acoustic signal resulting from synthesizing one or more object signals; and
a rendering step of positioning, for each acoustic signal generated, a virtual sound source in a predetermined listening space, the virtual sound source being associated with one of the object signals included in the generated acoustic signal,
wherein priority information indicating a priority of the acoustic signal is multiplexed with the coded acoustic information, and the rendering step determines, according to the priority indicated in the priority information, a size of an area of the predetermined listening space which is allocated to the acoustic signal, and positions, within the area allocated to the acoustic signal, the virtual sound source of each of the object signals included in the acoustic signal, the priority information is global gain information indicating a gain of down-mixing information in the object-based coding, and the priority is proportional to the gain, the coded acoustic information includes gain ratio information indicating a gain ratio of each of the object signals to the down-mixing information, and the object decoding step calculates, for each of the object signals, a product of a value of the global gain information and a value of the gain ratio information, and provides a value of the calculated product as second priority information for each of the object signals, and wherein each of the object signals is associated with one sound source in an acoustic space in which the coded acoustic information is coded on an object basis, the acoustic signal is a signal resulting from synthesizing the one or more object signals generated in the acoustic space, and the rendering step determines the size of the area so that a larger area is allocated to the acoustic signal with a higher priority.

12. A decoding method, comprising:

an object decoding step of receiving a plurality of pieces of coded acoustic information that was coded on an object basis and decoding the received coded acoustic information on an object basis to generate an acoustic signal from each piece of the coded acoustic information, the acoustic signal resulting from synthesizing one or more object signals; and a rendering step of positioning, for each acoustic signal generated, a virtual sound source in a predetermined listening space, the virtual sound source being associated with one of the object signals included in the generated acoustic signal, wherein priority information indicating a priority of the acoustic signal is multiplexed with the coded acoustic information, and the rendering step determines, according to the priority indicated in the priority information, a size of an area of the predetermined listening space which is allocated to the acoustic signal, and positions, within the area allocated to the acoustic signal, the virtual sound source of each of the object signals included in the acoustic signal, each piece of the coded acoustic information includes identification information for specifying an acoustic space, the object decoding step (i) measures, for each piece of the identification information, a code length of the coded acoustic information received per unit time, (ii) sets the code length of the coded acoustic information measured per unit time, as an activity level of the acoustic space specified using the identification information, and (iii) determines, for each acoustic space, the priority of the acoustic signal based on the priority information and the activity level, and the rendering step determines the size of the area which is included in the acoustic space specified using the identification information and allocated to the acoustic signal so that the area becomes larger as the priority determined for each piece of the identification information increases, and wherein each of the object signals is associated with one sound source in the acoustic space in which the coded acoustic information is coded on an object basis, the acoustic signal is a signal resulting from synthesizing the one or more object signals generated in the acoustic space, and the rendering step determines the size of the area so that a larger area is allocated to the acoustic signal with a higher priority.

13. A decoding method, comprising:

an object decoding step of receiving a plurality of pieces of coded acoustic information that was coded on an object basis and decoding the received coded acoustic information on an object basis to generate an acoustic signal from each piece of the coded acoustic information, the acoustic signal resulting from synthesizing one or more object signals; and a rendering step of positioning, for each acoustic signal generated, a virtual sound source in a predetermined listening space, the virtual sound source being associated with one of the object signals included in the generated acoustic signal, wherein priority information indicating a priority of the acoustic signal is multiplexed with the coded acoustic information, and the rendering step determines, according to the priority indicated in the priority information, a size of an area of the predetermined listening space which is allocated to the acoustic signal, and positions, within the area allocated to the acoustic signal, the virtual sound source of each of the object signals included in the acoustic signal, and the object decoding step determines the priority of the acoustic signal for each acoustic space so that the priority increases as the object signals included in the acoustic signal increases in number, and wherein each of the object signals is associated with one sound source in the acoustic space in which the coded acoustic information is coded on an object basis, the acoustic signal is a signal resulting from synthesizing the one or more object signals generated in the acoustic space, and the rendering step determines the size of the area so that a larger area is allocated to the acoustic signal with a higher priority.

* * * * *